United States Patent
Mochizuki et al.

(10) Patent No.: US 7,868,883 B2
(45) Date of Patent: Jan. 11, 2011

(54) ELECTRO-OPTICAL DEVICE AND ELECTRONIC APPARATUS HAVING THE SAME

(75) Inventors: Hiroaki Mochizuki, Chino (JP); Kazuya Nakayama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1013 days.

(21) Appl. No.: 11/420,496

(22) Filed: May 26, 2006

(65) Prior Publication Data

US 2006/0267913 A1 Nov. 30, 2006

(30) Foreign Application Priority Data

| May 27, 2005 | (JP) | ............................ 2005-155003 |
| Jul. 28, 2005 | (JP) | ............................ 2005-218731 |
| Mar. 7, 2006 | (JP) | ............................ 2006-060769 |

(51) Int. Cl.
  G06F 3/038 (2006.01)
  G09G 5/00 (2006.01)
  G09G 3/36 (2006.01)

(52) U.S. Cl. ........................................ 345/211; 345/87

(58) Field of Classification Search ......... 345/204–206, 345/137, 55, 84, 211–215, 87–95, 100, 208, 345/210, 98–104; 349/19–55
  See application file for complete search history.

(56) References Cited

U.S. PATENT DOCUMENTS

| 5,287,092 A | * | 2/1994 | Shiraishi ...................... 345/98 |
| 5,363,118 A | * | 11/1994 | Okumura ...................... 345/95 |
| 6,262,702 B1 | * | 7/2001 | Murade ........................ 345/87 |
| 6,831,424 B2 | * | 12/2004 | Youn et al. ................... 315/248 |
| 2001/0003418 A1 | * | 6/2001 | Fujita et al. .............. 324/76.54 |
| 2001/0005196 A1 | * | 6/2001 | Ishii ........................... 345/100 |
| 2001/0040567 A1 | * | 11/2001 | Kikuchi ...................... 345/211 |
| 2003/0067458 A1 | * | 4/2003 | Anzai .......................... 345/204 |
| 2004/0150636 A1 | * | 8/2004 | Choi ........................... 345/211 |
| 2004/0239610 A1 | * | 12/2004 | Ishii ........................... 345/100 |
| 2005/0023956 A1 | * | 2/2005 | Kwak et al. ................. 313/495 |
| 2005/0179036 A1 | * | 8/2005 | Yamazaki et al. ............. 257/66 |

FOREIGN PATENT DOCUMENTS

| JP | A-08-082804 | 3/1996 |
| JP | A-09-171189 | 6/1997 |
| JP | A-2004-126551 | 4/2004 |

* cited by examiner

*Primary Examiner*—Amr Awad
*Assistant Examiner*—Liliana Cerullo
(74) *Attorney, Agent, or Firm*—Oliff & Berridge, PLC

(57) ABSTRACT

There is provided an electro-optical circuit including: a substrate; a plurality of data lines and a plurality of scan lines disposed in a pixel region on the substrate to intersect each other; a plurality of pixel portions disposed at intersections of the data lines and the scan lines; a scan line driver circuit which applies scan signals through the scan lines to the pixel portions; an image signal apply circuit which applies image signals through the data lines to the a plurality of the pixel portions; and a plurality of power supply lines used to supply multiple-system powers to at least one of the scan line driver circuit and the image signal apply circuit.

10 Claims, 20 Drawing Sheets

ELECTRO-OPTICAL DEVICE AND ELECTRONIC APPARATUS HAVING THE SAME

BACKGROUND

1. Technical Field

The present invention relates to an electro-optical device such as a liquid crystal device and an electronic apparatus having the electro-optical device such as a liquid crystal projector.

2. Related Art

Generally, in an electro-optical device, a plurality of external circuit connection terminals are disposed along a periphery of one side of a substrate where display electrodes such as pixel electrodes and circuit units for driving the display electrodes such as a data line driver circuit and a scan line driver circuit are disposed in addition, a plurality of lead lines which are led from a plurality of the external circuit connection terminals to the circuit units such as a scan line driver circuit and a data line driver circuit are formed on the substrate. In many cases, the data line driver circuit is disposed along one side of the substrate where the external circuit connection terminals are disposed, and the scan line driver circuit is disposed along at least one side of two sides which are located at both end of the one side.

A clock signal which is a basic signal for a driving operation of the data line driver circuit and an inverted clock signal having an inverted phase with respect to the clock signal are applied from an external circuit through the external circuit connection terminals and the lead lines to the data line driver circuit. Since it is preferable that a phase of the clock signal and a phase of inverted clock signal are accurately inverted phases, a phase difference compensation circuit which compensates for the phases of the two clock signals so as to be the inverted phases is also disposed on the substrate (see JPA 2004-126551).

According to a technique disclosed in JPA 2004-126551 proposed by the inventors, in order to reduce noise of image signals originated from the clock signal and the inverted clock signal which characteristically have a very high frequency, the image signals are led from one side (for example, in proximity of the left side) of the data line, and the clock signals are led from the other side (for example, in proximity of the right side) of the data line. In addition, in order to provide a function of electromagnetically shielding the image signal lines from the clock signals which are high frequency noise sources and in order for the lead lines not to intersect each other on the substrate, low potential power supply lines for, for example, a ground potential are led from one side (for example, in proximity of the left side) of the data lines along the image signal lines to the phase difference compensation circuit, and high potential power supply lines are led from the other side (for example, in proximity of the right side) of the data lines along the clock signal lines to the phase difference compensation circuit. The clock signal, the inverted clock signal, various power supply signals, image signals, control signals, and various signals for operating the data line driver circuit and the phase difference compensation circuit can be applied through theses lines.

In addition, in order to reduce failures in operations due to interference to such signals, a research for an arrangement of external circuit connection terminals are proposed by the inventors (see JPA 2004-126551 and JPA H8-82804).

However, the inventors have found out that, in a case where various circuits disposed in such types of electro-optical devices are driven with a common power supply, deformation occurs in waveforms of signals due to the power supply. For example, the inventors have found out that, deformation occurs in waveforms of the sampling signals which are applied to the sampling circuit for sampling the image signals. More specifically, when transmission signals which are sequentially output from a shift register at a rising or falling time of the clock signal or the inverted clock signal are waveshaped, deformation may occurs in waveforms of pulses of multiple-system enable signals which are used to output the sampling signals having a predetermined pulse width. If the deformation occurs in waveforms of the pulses of the enable signals, the waveform of the sample signals which are waveshaped based on the transmission signals by using the enable signals to be output to the sampling circuit are deformed, so that display performance deteriorates. In addition to the sampling circuit, in a case where various circuits of the electro-optical device are driven with a common power supply, deformation occurs in the clock signals for driving the circuits.

SUMMARY

An advantage of the invention is that it provides an electro-optical device capable of reducing deformation in waveforms of sampling signals which are applied to a sampling circuit for sampling image signals or reducing deformation in waveforms in circuits for applying the image signals and an electronic apparatus having the electro-optical device.

According to an aspect of the present invention, there is provided an electro-optical device comprising: a substrate; a plurality of data lines and a plurality of scan lines disposed in a pixel region on the substrate to intersect each other; a plurality of pixel portions corresponding to intersections of the data lines and the scan lines; a scan line driver circuit which applies scan signals through the scan lines to the pixel portions; an image signal apply circuit which applies image signals through the data lines to the plurality of the pixel portions; and a plurality of power supply lines to supply power to at least one of the scan line driver circuit and the image signal apply circuit.

According to the electro-optical device in the operation thereof, the image signals are applied through, for example, the external circuit connection terminals to the image signal lines and to the sampling circuit constituting, for example, the image signal apply circuit. In addition to the applying of the image signal, the sampling signals are sequentially applied to the sampling switches corresponding to the data lines by using a data line driver circuit constituting, for example, the image signal apply circuit. Therefore, by the sampling switches constituting, for example, the sampling circuit, the image signals on the image signal lines are sampled according to the sampling signal and applied to a plurality of the data lines. In addition, the sampling switches are constructed with, for example, a single channel type TFTs, and the sampling switches are in an on state by electrically connecting the source thereof to the image signal lines, electrically connecting the drains thereof to the data lines, and applying the sampling signals to the gates thereof.

In this manner, when the data lines are driven, in the pixel portions disposed in the pixel portions, the image signals are applied from the date lines to the display devices through the pixel switching device for performing switching operation according to the scan signals applied from the scan line driver circuit through the scan lines. Here, the pixel region according to the invention denotes a region where a plurality of the pixel portions are disposed in a plan view of the substrate, than is, a region on which the image is to be displayed by driving a plurality of the pixel portions. For example, the image display region according to the aspect of the invention is an example thereof or a typical example thereof.

As a result, the liquid crystal device, that is, a display device, can display image based on the image signals in an active matrix drive type.

In the electro-optical device according to the invention, particularly, at least one of the scan line driver circuit and the image signal apply circuit are supplied with the multiple-system powers. The multiple-system powers denote a presence of a power supply which is constructed as a set of, for example, a high potential power supply and a low potential power supply having a lower potential than the high potential power supply.

The powers are supplied as individual powers or as a partially common power to various circuits included in at least one of the scan line driver circuit and the image signal apply circuit. Therefore, in comparison with a case where all the circuits included in at least one of the scan line driver circuit and the image signal apply circuit are driven with a common power supply, it is possible to reduce defects of operations of at least one of the scan line driver circuit and the image signal apply circuit caused by the clock noise which is propagated through the power supply to the circuits include in at least one of the scan line driver circuit and the image signal apply circuit.

More specifically, since the image signal apply unit is driven with the clock signal and the inverted clock signal having a relatively higher frequency than that of the scan line driver circuit, deformation in pulse waveforms of the signals caused by the clock noise may occur. In order to suppress the deformation in pulse waveforms, by providing individual power supplies to the circuits, the propagation of the clock noise into the circuits driven with other power supplies can be suppressed.

Here, the clock noise denotes a noise causing the deformation in waveforms of the signals due to the interference of a signal having an arbitrary frequency to other signals having a frequency closer to the frequency of the signal. Therefore, the circuits which are driven with the signals of which waveforms are easily deformed due to the interference therebetween or the circuits which output such a signal are driven with different power supplies, it is possible to reduce the deformation in waveforms caused by the clock noise. For example, since the deformation in waveforms of the sampling signals applied to the sampling circuit, the image signal can be applied to the pixel portions at suitable timings with suitable waveforms, so that it is possible to reduce the occurrence of, for example, stripe-shaped irregularity or band-shaped irregularity in the pixel region. As a result, a high quality image display of the electro-optical device can be implemented.

As described above, according to the electro-optical device of the invention, the deformation in waveforms of the sampling signals applied to the sampling circuit for sampling the image signals can be reduced, and the deformation in waveforms in the image signal apply unit for applying the image signal can be reduced.

In the electro-optical device according to the aforementioned aspect of the invention, the image signal apply circuit may comprise a data line driver circuit which applies a sampling signal to a sampling circuit including a plurality of sampling switches which apply the image signals through the data lines to a plurality of the pixel portions according to the sampling signal, and the data line driver circuit may be driven with the multiple-system power supplies.

In the electro-optical device, the data line driver circuit is driven with the multiple-system powers, and the sampling signals are applied to a plurality of the sampling switches through the data lines. In the data line driver circuit, the adjusted transmission signals are input as sampling pulse to the sampling switches provided to the data lines in the sampling circuit, the image signals are sampled according to the sampling pluses by the sampling switches, and the sampled image signals are input to the data lines corresponding to the image signals. Here, as described above, the sampling pulse denotes a timing control signal in the sampling process in order to selectively apply the image signals applied to the image signal lines to the data lines.

The multiple-system powers are supplied as individual powers or as a partially common power to the various circuits included in the data line driver circuit. Therefore, in comparison with a case where all the circuits included in the data line driver circuit are driven with a common power supply, it is possible to reduce defects of operations of the data line driver circuit caused by the clock noise which is propagated through the power supplies to the data line driver circuit. More specifically, for example, the data line driver circuit is driven with the clock signal or the inverted clock signal having a higher frequency than that of the scan line driver circuit, the deformation in pulse waveforms of the signals caused by the clock noise may occur. In order to suppress the deformation in pulse waveforms, by providing individual power supplies to the circuits, the propagation of the clock noise into the circuits driven with other power supplies can be suppressed. Here, the clock noise denotes a noise causing the deformation in waveforms of the signals due to the interference of a signal having an arbitrary frequency to other signals having a frequency closer to the frequency of the signal. Therefore, the circuits which are driven with the signals of which waveforms are easily deformed due to the interference therebetween or the circuits which output such a signal are driven with different power supplies, it is possible to reduce the deformation in waveforms caused by the clock noise. Particularly, since the deformation in waveforms of the sampling signals applied to the sampling circuit for applying the image signals to the pixel portions can be reduced, the image signals can be applied to the pixel portions at suitable timings with suitable waveforms, so that it is possible to reduce the occurrence of, for example, stripe-shaped irregularity or band-shaped irregularity in the image display region. As a result, a high quality image display of the electro-optical device can be implemented.

In the electro-optical device according to the aforementioned aspect of the invention, the multiple-system powers may be supplied to only the data line driver circuit among the scan line driver circuit and the data line driver circuit.

For example, although the period of the scan signal output from the scan line driver circuit and the period of the transmission signal or the sampling signal output from the data line driver circuit are very different from each other to a degree that the interference therebetween does not occur, the deformation of various signals due to a few of clock noises may occur. More specifically, a case where the deformation in waveforms of the sampling signals output from the data line driver circuit data line driver circuit caused b the clocking signal applied to the scan line driver circuit occur may also be considered. Therefore, since the multiple-system powers are supplied to only the data line driver circuit among the scan line driver circuit and the data line driver circuit, the image quality can be improved. More specifically, by driving the scan line driver circuit and the data line driver circuit with different power supplies, the deformation in waveforms of various signals caused by the clock noise can be reduced down to a level that there are no problems in practical use.

As a result, according to the electro-optical device, the deformation in waveforms of the various signals including, for example, the sampling signals output from the data line driver circuit can be reduced, so that it is possible to improve display quality of the electro-optical device.

In the electro-optical device according to the aforementioned aspect of the invention, the data line driver circuit may comprise a shift register which sequentially outputs transmission signals from a plurality of stages thereof based on a clock signal having a predetermined period, and the shift register and other circuits included in the data line driver circuit may be driven with different power supplies among the multiple-system power supplies.

According to the electro-optical device, the shift register outputs the transmission signals according to the clock signal having a predetermined period, and the transmission signals are sequentially output from the stages of the shift register. The sequentially outputting denotes outputting one-by-on from the stages, and it is not limited to a case where a time sequence of the transmission signals corresponds to a physical arrangement of the stages.

In this manner, since the shift register outputting the transmission signals is driven with a power supply different from those of other circuits included in the data line driver circuit, the deformation in waveforms of the signals output from the other circuits caused by the clock signal for defining timings of the transmission signals can be reduced. More specifically, in a case where the shift register and the other circuits are driven with a common power and output various signals, the deformation in waveforms of the signals output from the other circuit influenced by the clock signal may occur. Therefore, in the electro-optical device, the power supply for the shift register and the power supplies for the data line driver circuit are designed to be different from each other, so that the deformation in waveforms of the signals output form the other circuits influenced by the clock signal can be reduced. Here, the "other circuit" may be any circuit among the circuits include in the data line driver circuit excluding the shift register.

In the electro-optical device according to the aforementioned aspect of the invention, other circuits may include at least one circuit of a phase difference compensation circuit which compensates for a phase difference between the clock signal having a predetermined period and an inverted clock signal having an inverted phase with respect to the clock signal and a logic circuit which wave-shapes pulses of the sequentially-output transmission signals by using multi-sequence enable signals, and the shift register and the one circuit may be driven with different power supplies.

According to the electro-optical device, sine the powers supplied to at least one of the phase compensation circuit and the logic circuit included in the data line driver circuit and the power supplied to the shift register are different from each other, the noise clock cannot be propagated between the at least one circuit of the phase compensation circuit and the logic circuit and the shift register, the deformation in waveforms of the signals output from the one circuit caused by the influence of the clock signal or the inverted clock signal can be reduced. On the other hand, the one circuit may include any one of the phase compensation circuit and the logic circuit or both of the phase compensation circuit and the logic circuit.

Here, the "logic circuit" denotes a circuit which outputs the transmission signal of which waveform is shaped in a single stage or a plurality of stages as a sampling signal to the sampling circuit. In addition, the logic circuit denotes a circuit which performs wave-shaping on the transmission signal by using multiple sequences of enable signals as a typical high frequency process and, after that, outputs the sampling signal. More specifically, for example, the pulse width of the transmission signal is limited by the pulse widths of the multiple sequences of the enable signals having a smaller width.

Here, the "multiple sequences" denote a case where a plurality of enable signal generation circuits, a plurality of enable signal apply paths, other signal generation sources, or other signal apply paths having the same construction or different constructions are independently formed to be different from each other and also includes a case where they are finally overlapped with each other to be treated as a continuous signal. In this case, although signals intend to have the same waveform originally, the waveforms may be slightly different from each other due to characteristics of the circuit devices or electrical influence of the devices and wire lines. Since the multiple sequences of the enable signals can be treated as independent signals, the transmission signals sequentially output from the shift register can be subject to time division and be applied and distributed to a plurality of the signal lines.

In order to output better wave-shaped sampling signals, the sampling signals may be wave-shaped by using a single sequence of enable signals. According to such a wave-shaping process, in comparison with a case where the wave-shaping is performed by using the multiple sequences of the enable signal, the waveforms of the sampling signals can be effectively equalized. Since the enable signals are applied to the logic circuit in a period equivalent to that of the clock signal which defines the timings of outputting the transmission signals, for examples in a case where the logic circuit is included in the one circuit, if the power supplies of the one circuit and the shift register are common to each other, the deformation in waveforms of the enable signals caused by the clock noise according to the clock signal and the inverted clock signal propagated through the power supply lines may occur. More specifically, skirt-shaped deformation in waveforms of the enable signals occurs at the rising or falling time of the enable signals, the enable signal may not in an equalized state enough to wave-shape the transmission signals. According to the electro-optical device, the skirt-shaped deformation in waveforms of the enable signals can be reduced, and the stripe-shaped irregularity in the image display region can be reduced, so that it is possible to improve display quality.

In the electro-optical device according to the aforementioned aspect of the invention, in a case where the one circuit includes the logic circuit, the power supply for driving the scan line driver circuit and the power supply for driving the logic circuit among the multiple-system power supplies may be a common power supply.

For example, since the period of the scan signal output from the scan line driver circuit and the period or the transmission signal or the sampling signal output from the data line driver circuit are very different from each other to a degree that the interference therebetween does not occur, although the powers for the scan line driver circuit and the logic circuit are common to each other, the deformation in waveforms of the sampling signals does not occur. More specifically, for example, the frequency of the clock signal applied to the scan line driver circuits is about several kHz, and the frequency of the clock signal applied to the data line driver circuit is about several MHz.

Therefore, the sizes in frequency of the clock signals applied to the scan line driver circuit and the data line driver circuit are very different from each other. By using the clock signals having such a frequency difference, is possible to reduce the occurrence of waveform deformation caused by clock noise down to a level that there are no problems in practical use between the circuits which output the scan signals or the transmission signals.

Therefore, according to the electro-optical device, since the number of multiple-system power supplies can be reduced; the circuit construction can be simplified. In addition, in a case where wire lines having the number corresponding to the total number of the power supplies are provided so as to supply the multiple-system powers, the deformation of the signals caused by the interference between the wire lines can be reduced. In addition, according to the electro-optical device, it is particularly useful for a case where the number of the terminals for supplying the powers is limited due to the limitation to a layout on the substrate.

In the electro-optical device according to the aforementioned aspect of the invention, the multiple-system powers may be supplied by external power supplies which are electrically connected to a plurality of terminal portions which are individually provided corresponding to the multiple-system powers.

According to the electro-optical device, since the a plurality of the terminal portions are individually supplied with the multiple-system powers, in comparison with a case where the multiple-system powers are supplied through a common terminal portion, the propagation of the clock noise can be suppressed. More specifically, for example, by providing individual terminal portions on the substrate, the propagation of the clock noise can be further suppressed in comparison with a case where a power from a single terminal portion is distributed into a plurality of the terminal portions.

In the electro-optical device according to the aforementioned aspect of the invention, the external power supplies may supply the multiple-system powers to a plurality of the terminal portions through a plurality of power supply units which are individually provided corresponding to the multiple-system powers.

According to the electro-optical device, for example, since a plurality of the power supply units for supplying the multiple-system powers are provided to a connector such as FPD in advance, a propagation path of the clock noise can be removed in advance at the stage of supplying the powers to the substrate.

As a result, according to the electro-optical device, the propagation of the clock noise which passes through the power supply units for supplying the powers can be reduced, so that it is possible to improve display quality of the electro-optical device.

In the electro-optical device according to the aforementioned aspect of the invention, a plurality of the power supply lines may be constructed with a plurality of conductive films which are located in separate layers interposed between interlayer insulating films.

According to the electro-optical device, for example, the first high potential power supply lines for supplying the first high potential power, that is, a high potential power among the first-system powers are constructed with the first conductive film, and the first low potential power supply lines for supplying the first low potential power, that is, a low potential power among the first-system powers is constructed with the second conductive film which is disposed in the separate layers different from the first conductive film with the interlayer insulating film interposed therebetween. Therefore, a degree of a freedom in design for layout or wiring of the first high potential power supply line and the first low potential power supply line can be heightened. In addition, the first high potential power supply line and the first low potential power supply line are at least partially overlapped with each other in a plan view of the substrate, the area required for wiring on the substrate can be reduced. Therefore, a size of the substrate can be reduced. Namely, the liquid crystal device can be miniaturized. In addition, since an area corresponding to the reduced area required for wiring on the substrate can be secured for wiring, the wire line widths of the power supply lines can be enlarged. Therefore, the power supply lines can be formed to have low resistance.

In the electro-optical device according to the aforementioned aspect of the invention, each of the pixel portions may include a storage capacitor which is constructed by sequentially stacking a lower electrode, a dielectric film, and an upper electrode on the substrate, and each of the conductive films may be the same as any one of conductive films which constitutes the data lines, the lower electrode, and the upper electrode.

According to the electro-optical device, a plurality of the conductive films may be the same film as any one of a plurality of the conductive films constituting the data lines, the lower electrode, and the upper electrode. Here, the "same films" denote films which are formed at the same processes in the production process and the same type of films. However, the "same films" do not denote films which need to be continuous with each other as a single film, but include some portions of films divided from a single film. Therefore, a plurality of the power supply lines can be formed in the same process for forming the data lines, the lower electrode, or the upper electrode. As a result, a plurality of the power supply lines can be formed with different conductive films without complication of the production processes.

In addition, by using a storage capacitor, the potential storage characteristics in the pixel electrodes constituting the pixel portions can be improved, so that high contrast of display can be obtained.

In the electro-optical device according to the aforementioned aspect of the invention, one power supply line which is used to supply at least one system power among the power supply lines and other power supply line which is different from the one power supply line may be constructed with different ones of the conductive films which are at least partially different from each other, and the one power supply line and the other power supply line may be at least partially overlapped with each other on the substrate in a plan view thereof.

According to the electro-optical device, the defects of operations of the image signal apply circuit caused by the propagation of the clock noise through the power supplies to various circuits included in the image signal apply circuit can be securely reduced, and a degree of freedom in settings of wiring of the power supply lines can be heightened, so that the electro-optical device can be miniaturized.

In the electro-optical device according to the aforementioned aspect of the invention, each of the multiple-system power supplies may be a set of a high potential power supply and a low potential power supply of which potential is lower than that of the high potential power supply, a plurality of the power supply lines may include a plurality of high potential power supply lines which are used to supply the high potential powers and a plurality of low potential power supply lines which are used to supply the low potential powers, and the high and low potential power supply lines which are used to supply at least one system power among the multiple-system powers may be constructed with the conductive films which are at least partially different from each other and at least partially overlapped with each other on the substrate in a plan view thereof.

According to the electro-optical device, the defects of operations of the image signal apply circuit caused by the propagation of the clock noise through the power supplies to various circuits included in the image signal apply circuit can be securely reduced, and a degree of freedom in settings of wiring of the power supply lines can be heightened, so that the electro-optical device can be miniaturized.

In the electro-optical device according to the aforementioned aspect of the invention, at least two high potential power supply lines among a plurality of the high potential power supply lines may be constructed with different conductive films and at least partially overlapped with each other on the substrate in a plan view thereof.

According to the electro-optical device, since at least two high potential lower supply lines among a plurality of the high potential lower supply lines are constructed with different conductive films, a plurality of the high potential lower supply lines are designed to be partially or entirely overlapped with each other in a plan view of the substrate, so that an area required for wiring on the substrate can be more securely reduced.

In the electro-optical device according to the aforementioned aspect of the invention, at least two low potential power supply lines among the a plurality of the low potential power supply lines may be constructed with different conductive films and at least partially overlapped with each other on the substrate in a plan view thereof.

According to the electro-optical device, since at least two low potential lower supply lines among a plurality of the low potential lower supply lines are constructed with different conductive films, a plurality of the low potential lower supply lines are designed to be partially or entirely overlapped with each other in a plan view of the substrate, so that an area required for wiring on the substrate can be more securely reduced.

In the electro-optical device according to the aforementioned aspect of the invention, at least one power supply line among a plurality of the power supply lines may be constructed with a plurality of partial wire lines which are constructed with at least two layers of conductive films among a plurality of the conductive films, and a plurality of the partial wire lines may be electrically connected to each other through contact holes and at least partially overlapped with each other on the substrate in a plan view thereof.

According to the electro-optical device, at least one power supply line is constructed with a plurality of partial wire lines which are formed with at least two-layered conductive films which are connected to each other through contact holes. Therefore, for example, even in a case where an area required for wiring a plurality of the power supply lines on the substrate is reduced and wire line widths need to be reduced, the wire lines can be formed to have low resistance. In addition, since a plurality of the partial wire lines can be used as redundant wire lines, in comparison with a case where the power supply line is constructed with a single conductive film, it is possible to stably supply the power to the image signal apply circuit.

According to another aspect of the present invention, there is provided an electronic apparatus comprising the electro-optical device according to the aforementioned aspect of the invention.

Since the electronic apparatus according to the invention comprises the electro-optical device according to the invention described above, a variety of electronic apparatuses capable of displaying an image with high quality can be embodied, such as a television, a mobile phone, an electronic pocketbook, a word processor, a view finder type or monitor direct vision-type video tape recorder, a work station, a television phone, a POS terminal, an apparatus having a touch panel, and the like. Examples of the electronic apparatus can also include an electrophoresis device such as an electronic paper.

The above-mentioned operations and other advantages of the invention will be clarified from the following embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, embodiments of the invention will be described with reference to the accompanying drawings. In the embodiments, a driver-circuit-embedded TFT active matrix drive type liquid crystal device is exemplified as an example of electro-optical device of the invention.

First Embodiment

A liquid crystal device according to a first embodiment will be described with reference to FIGS. 1 to 12.

Figure 1:
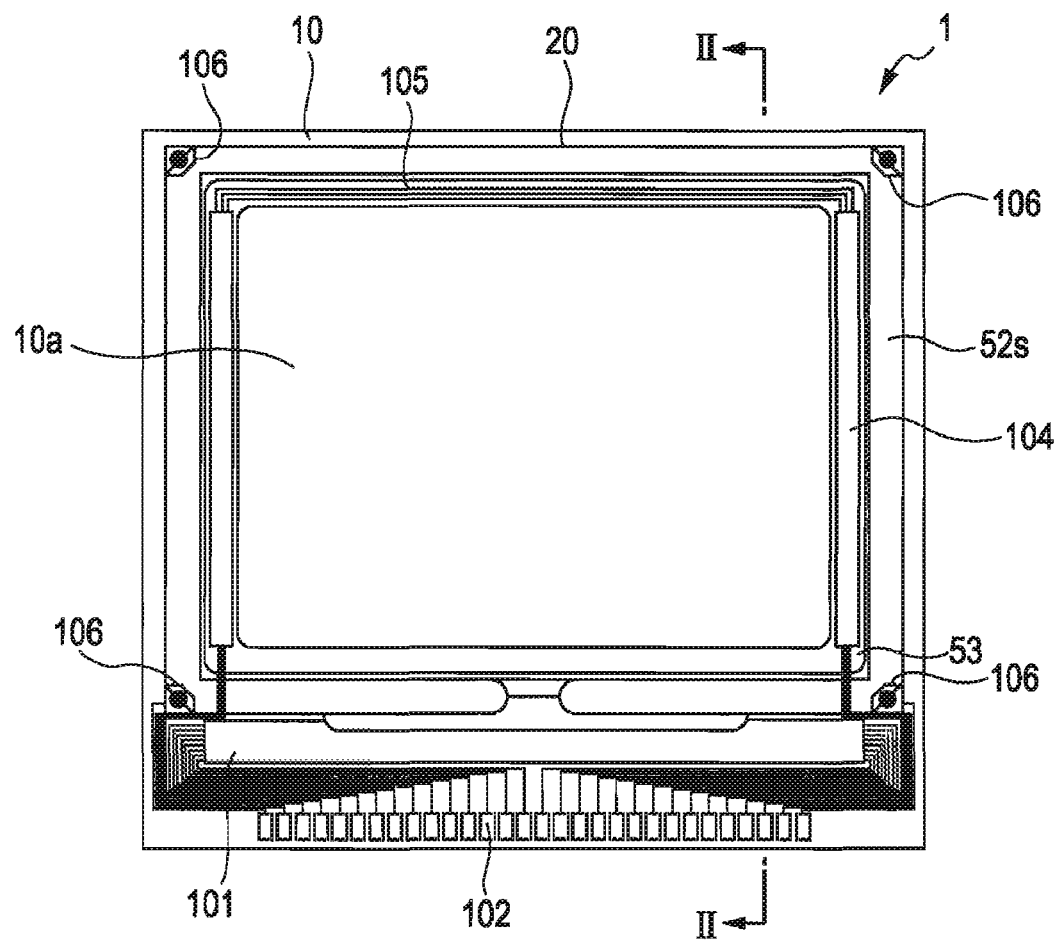
FIG. 1 is a plan view showing a whole construction of a liquid crystal device according to a first embodiment.

Firstly, a whole construction of the liquid crystal device according to the embodiment will be described with reference to FIGS. 1 to 12. FIG. 1 is a plan view showing the whole construction of the liquid crystal device, and FIG. 2 is a cross-sectional view taken along line H-H' of FIG. 1.

Figure 2:
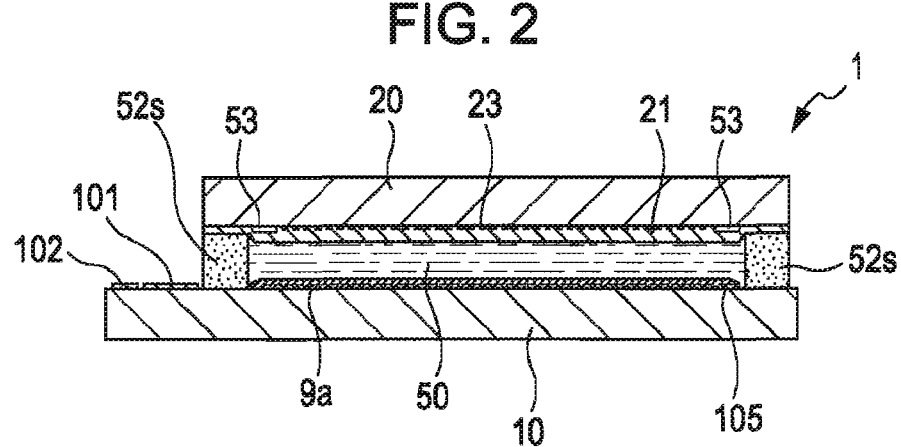
FIG. 2 is a cross-sectional view taken along line H-H' of FIG. 1.

Referring to FIGS. 1 and 2, the liquid crystal device 1 includes a TFT array substrate 10 and an opposite substrate 20 which are disposed to face each other. A liquid crystal layer 50 is interposed and sealed between the TFT array substrate 10 and the opposite substrate 20, and the TFT array substrate 10 and the opposite substrate 20 are attached to each other with a sealing member 52s which is disposed in a sealing region around an image display region 10a which is an example of a pixel region according to the invention. The sealing member 52s is made of, for example, a TFT curing resin or thermosetting resin for attaching the two substrates. The sealing member, in a manufacturing process, is applied on the TFT array substrate 10, and after that, are cured with UV illumination or heating. In addition, gap materials such as gas fibers and glass beads for maintaining an interval (a gap between substrate) between the TFT array substrate 10 and opposite substrate 20 in a predetermined value are dispersed in the sealing member 52s. A frame light-blocking film 53 having a light blocking property which defines a frame region of the image display region 10a is disposed on the opposite substrate 20 along an inner side of the sealing region where the sealing member 52s is disposed. A portion of or the entire frame light-blocking film 53 may be constructed as an embedded light-blocking film in the TFT array substrate 10.

On the TFT array substrate 10, in a peripheral region around the image display region 10a, a data line driver circuit 101 and external circuit connection terminals 102 are disposed along one side of the TFT array substrate 10. In addition, scan line driver circuits 104 are disposed along two sides adjacent to the one side so as to be covered with the frame light-blocking film 53 in order to connect the two scan line driver circuit 104, a plurality of wire lines 105 including later-described scan-line-driver-circuit power supply lines and scan-line-driver-circuit control signal wire lines are disposed along the remaining one side of the TFT array substrate 10 so as to be covered with the frame light-blocking film 53. In addition, up-down conduction terminals 106 for providing electrical conduction between the two substrates are disposed between the TFT array substrate 10 and the opposite substrate 20.

Referring to FIG. 2, on the TFT array substrate 10a, a pixel electrode 9a and an alignment layer thereon are disposed on a TFT, that is, a pixel switching device and various wire lines. On the other hand, in the image display region 10a on the opposite substrate 20, an opposite electrode 21 is disposed to face a plurality of the pixel electrodes 9a with the liquid crystal layer 50 interposed. A liquid crystal capacitors are formed between the pixel electrode 9a and opposite electrode 21 by applying voltages thereto. A light-blocking film 23 having a shape of lattice or stripe is disposed on the opposite electrode 21, and the light-blocking film is covered with an alignment layer. The liquid crystal layer 50 is constructed with, for example, one type nematic liquid crystals or mixed liquid crystals including several types of nematic liquid crystals, and these liquid crystals are in a predetermined alignment state between a pair of the alignment layers.

Although not shown, in addition to the data line driver circuit 101 and the scan line driver circuits 104, an inspection circuit for inspecting quality and defects of the liquid crystal device in the production processes or at a shipping time thereof or the like may be disposed on the TFT array substrate 10. In addition, in one side of the opposite substrate 20 which projecting light is incident to or in one side of the TFT array substrate 10 which emitting light is incident to, polarizing films, phase difference films, polarizing plates, or the like are disposed in a predetermined direction according to an operation mode, for example, a TN (twisted nematic) mode, an STN (super TN) mode, or a D-STN (double-STN) mode or according to a mode criterion of a normally white mode and a normally black mode.

In a case where a semiconductor substrate made of a single crystal silicon or the like is used for the TFT array substrate 10, transistors may be used as pixel switching devices or switching devices constituting various driver circuits.

Figure 3:
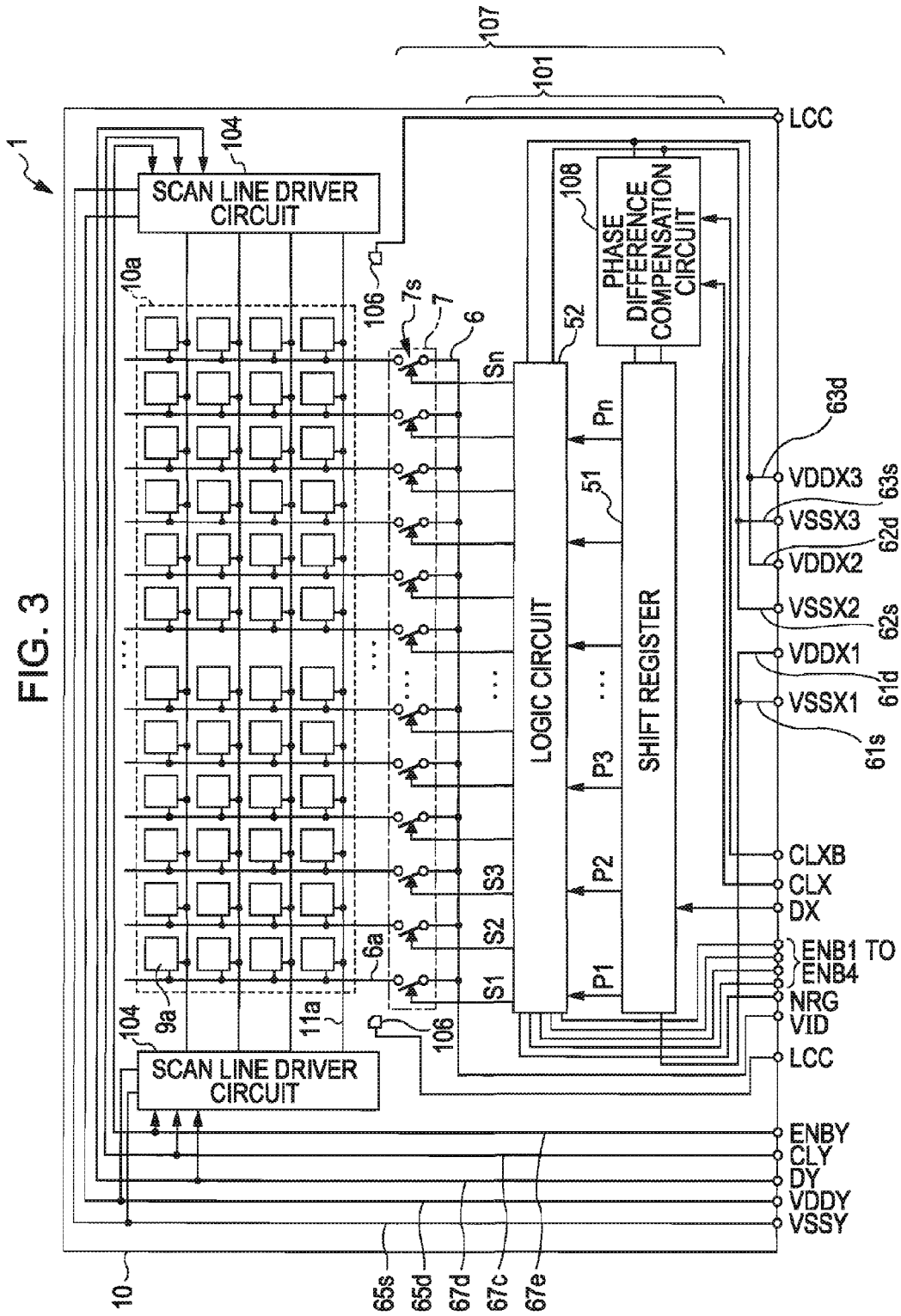
FIG. 3 is a circuit diagram showing a principal circuit construction of the liquid crystal device according to the first embodiment.
Figure 4:
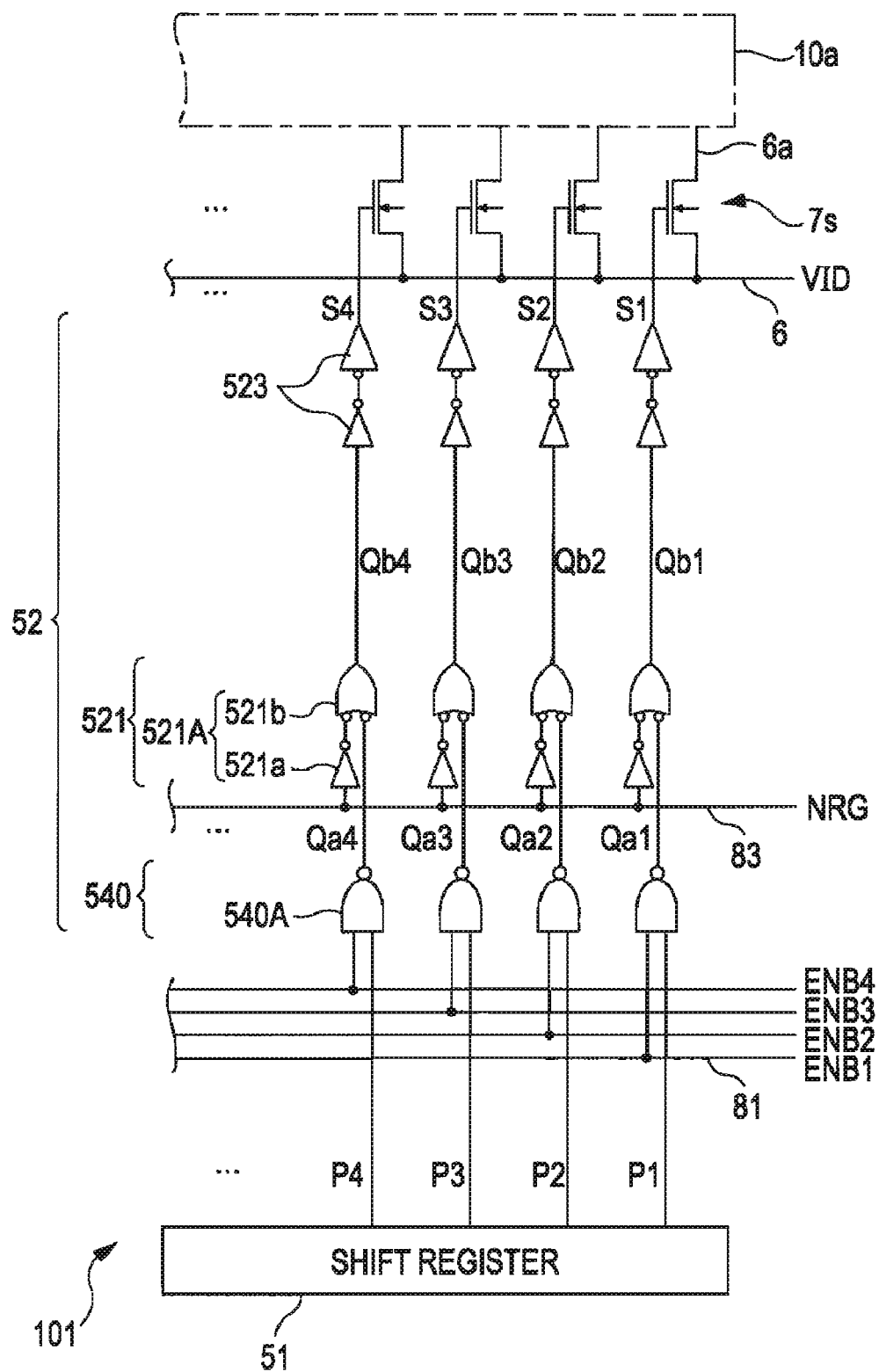
FIG. 4 is a view showing a circuit system related to transmission signal wave shaping among the construction shown in FIG. 3.
Figure 5:
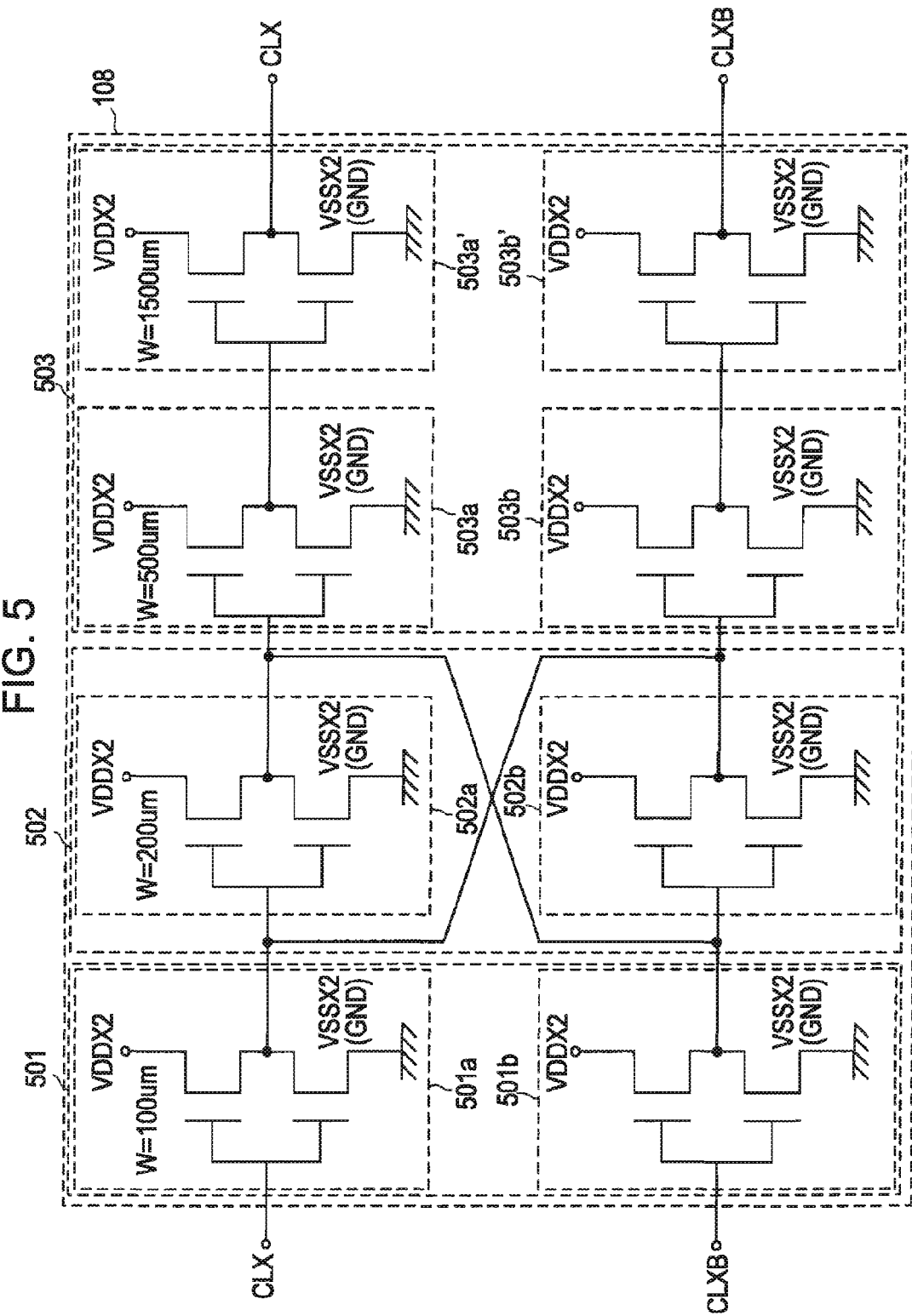
FIG. 5 is a circuit diagram of a phase difference compensation circuit.

Now, a principal construction of the liquid crystal device 1 will be described with reference to FIGS. 3 to 5. FIG. 3 is a circuit diagram showing the principle construction of the liquid crystal device. FIG. 4 is a view showing a circuit system related to transmission signal wave shaping among the construction shown in FIG. 3. FIG. 5 is a circuit diagram of a phase difference compensation circuit.

Referring to FIG. 3, the liquid crystal device 1 includes pixel electrode 9a, scan lines 11a, data lines 6a, scan line driver circuits 104, and an image signal apply circuit 107. The image signal apply circuit 107 includes a data line driver circuit 101 and a sampling circuit 7.

In the liquid crystal device 1, a TFT array substrate 10 and an opposite substrate 20 (not shown in the figure) which are constructed with, for example, a quartz substrate, a glass substrate, a silicon substrate, or the like are disposed to face each other with a liquid crystal layer interposed therebetween, and electric fields across the liquid crystal layer for the pixels are modulated by controlling voltages applied to the pixel electrodes 9a which are partitioned and arrayed in the image display region 10a. As a result, transmitting light amount between the two substrates is controlled, so that an image is displayed in grayscale. The liquid crystal device 1 employs a TFT active matrix drive type. A plurality of pixel electrodes 9a which are arrayed in matrix and a plurality of scan lines 11a and data lines 6a which are disposed to intersect each other are disposed in the image display region 10a of the TFT array substrate 10, so that pixel portions corresponding to pixels are constructed. Although not shown in the figure, as described later, TFTs which are controlled to turn on and off according to scan signals applied through the scan lines 11a and storage capacitors which sustain the voltages applied to the pixel electrodes 9a are disposed between the pixel electrodes 9a and data lines 6a. In addition, driver circuits such as a data driver circuit 101 are disposed in peripheral region of the image display region 10a.

The data line driver circuit 101 includes a shift register 51, a logic circuit 52, and a phase difference compensation circuit 108.

The shift register 51 is designed to sequentially output transmission signals Pi (i=1, ..., n) from stages thereof based on an X-side clock signal CLX having a predetermined period (and an inverted signal CLXB thereof) and a shift register start signal DX which are input to the data line driver circuit 101. At the time of operating the liquid crystal device 1, a power VDDX1 and a power VSSX1 having a lower potential than the power VDDX1 are supplied to the shift register 5, so that transistors constituting the shift register 51 are driven. Here, the power VDDX1 is an example of a high potential power according to the invention, and the power VSSX1 is an example of a low potential power according to the invention. More specifically, the power VDDX1 is a power supplied to drains of the transistors constituting the shift register 51, and the power VSSX1 is a power supplied to sources of the transistors constituting the shift register 51. In addition, later-described powers VSSX and VSSY are examples of a low potential power according to the invention, and later-described powers VDDX and VDDY are examples of a high potential power according to the invention. Namely, the powers VSSX and VSSY are powers having a lower potential than the powers VDDX and VDDY.

The logic circuit 52 includes a pulse width control unit and has a function of wave-shaping the transmission signals Pi which are sequentially output from the shift register 51 based on enable signals and finally outputting sampling circuit drive signals Si based thereon. Referring to FIG. 4, in addition to the pulse width control unit 540, the logic circuit 52 includes a pre-charging circuit 521 and inversion circuits 523.

Referring to FIG. 4, the pulse width control unit 540 includes logic circuits for wave-shaping waveforms of the transmission signals Pi output from the shift register 51. More specifically, the pulse width control unit 540 includes unitary circuits 540A which are provided corresponding to stages of the shift register 51, and each of the unitary circuits 540A is constructed with a NAND circuit.

In FIG. 4, the transmission signal Pi output from the stage corresponding to the shift register 51 and one of enable signals ENB1 to ENB4 applied to four enable apply lines 81 are input to a gate of the NAND circuit 540A. As a power for the NAND circuit 540A, the powers VDDX3 and VSSX3 are supplied to the NAND circuit 540 through wire lines (not shown in FIG. 4). The power VDDX3 is a signal input to a drain of a transistor constituting the NAND circuit 540A, and the power VSSX3 is a signal input to a source of the transistor constituting the NAND circuit 540A.

The NAND circuit 540A performs wave-shaping of the transmission signals Pi by using a logic AND operation of the input transmission signals Pi and enable signals ENB1 to ENB4. As a result, the NAND circuit 540A generates and outputs wave-shaped signals Qai, that is, signals which are obtained from the wave-shaping of the transmission signals Pi. In addition to the NAND circuit, each of the unitary circuits 540A may be provided with inversion circuits which performs logic inversion of the transmission signals Pi or the enable signals ENB1 to ENB4 input to the NAND circuit and the wave-shaped signals Qai output form the NAND circuit.

The waveforms of the transmission signals Pi are trimmed by the pulse width control unit 540 based on the waveforms of the enable signals ENB1 to ENB4 having a narrower pulse width than the transmission signals, and finally, pulse shapes thereof such as a pulse width and a pulse period are limited.

In this manner, in the pulse width control unit 540, the logic circuits are integrated therein, and the wave-shape is performed by the NAND circuit 540A, so that the pulse width control unit 540 can be formed with a simple construction without substantial increase in the number of circuit devices and wire lines. Therefore, the pulse width control unit 540 can be formed in a small space of the TFT array substrate 10 without substantial increase in the space.

The logic circuit 52 includes a pre-charging circuit 521 disposed corresponding to each of the stages of the shift register 51. The unitary circuit 521A is formed substantially as an NOR circuit including an inversion circuit 521a which performs a logic inversion operation on a pre-charging selection signal NRG applied to a pre-charging signal apply line 83 and an NAND circuit 521b of which gate is applied with the pre-charging selection signal NRG (of which logic is inverted by the inversion circuit 521a) and the wave-shaped signals Qai. The NOR circuit 521A performs a logic OR operation on the wave-shaped signal Qai and the pre-charging selection signal NRG and outputs one of the wave-shaped signal Qai and the pre-charging selection signal NRG as an output signal Qbi. The output signal Qbi is output through two inversion circuits 523 as a sampling pulse Si.

According to the circuit construction of the logic circuit 52, the pre-charging circuit 521 can be formed with a simple construction, so that the pre-charging circuit 521 can be constructed without increase in the number of circuit devices and wire lines. As a result, it is possible to further reduce a space for disposing the pre-charging circuit 521 on the TFT array substrate 10.

The sampling circuit 7 includes a plurality of sampling switches 7s provided to the data lines 6a, and each of the sampling switches 7s samples an image signal VID applied to the image signal lines 6 shown in FIG. 4 according to the sampling pulse Si and applies the sampled image signal to the data lines 6a as a data signal. In addition, each of the sampling switches 7s is constructed with a single channel type TFT, for example, a P channel type TFT or an N channel type TFT or a complementary FT.

Although a case where a single one image signal line 6 is provided and any one of the sampling switches 7s is applied with the image signal VID from the image signal line 6 is described in the embodiment, serial-parallel expansion, that is, a phase expansion may be used. For example, in a case where the image signal is expanded in a serial-parallel manner into six phases of image signals VID1 to VID6, these image signals are input through six image signal lines to the sampling circuit 7. By simultaneously applying parallel image signals which are obtained by transforming serial image signals to a plurality of the image signal lines 6, the image signals can be input to the data lines 6a in a group wise, so that it is possible to suppress a drive frequency.

Although, in the embodiment, the transmission signals Pi which are wave-shaped by the logic circuit 52 are output as sampling pulses Si, a master enable signal may be supplied as a power to the NAND circuit 540A in order to reduce deformation in waveforms of the sampling pulses Si caused by sequence errors of the enable signals ENB1 to ENB4. More specifically, in a case where the waveforms of the enable signals ENB1 to ENB4 are different, that is, a case where sequence errors of the enable signals ENB1 to ENB4 occur, the sequence errors of the enable signals ENB1 to ENB4 are provided through the sampling pulses S1 to S4 to the pulse shapes of the data signal, so that the sequences have different shapes. The data signals are applied from the data lines 6a to the pixel electrodes 9a of a selected pixel column, and the storage capacitors (not shown) are charged or discharged, so that data writing is performed. At this time, the sequence errors of the enable signals ENB1 to ENB4 are provided to the data signals, and the pulse shapes of the data signals are different in a sequence wise. As a result, brightness irregularity in a shape of a vertical stripe shape occurs on a display screen, so that a quality of image display may deteriorate.

On the other hand, a one-sequence signal is applied as a master enable signal to the NAND circuit 540A, so that the pulse shapes of the sampling signals can be equalized. By doing so, the data signals allow the brightness to be in a relatively proper value, so that it is possible to reduce or remove brightness irregularity of a displayed image caused by a difference between pulse widths. This is because the brightness of a displayed image depends on heights and widths of the data signals applied to the pixel electrodes 9a and distorted states thereof at rising and falling times thereof. By using the master enable signal, deformation of the sampling pulses Si caused by the sequence errors of the enable signals ENB1 to ENB4 does not occur, so that the sampling signals of which waveforms is not deformed but equalized can be applied to the sampling circuit 7.

Now, a construction of the phase difference compensation circuit 108 will be described in detail with reference to FIGS. 3 and 5. The phase difference compensation circuit 108 is disposed or the way of the signal lines for applying the clock signal CLX and the inverted clock signal CLXB to suitably perform timing adjustment between the clock signal CLX (that is, a normally-rotating clock signal) and the inverted clock signal CLXB. More specifically, the phase difference compensation circuit 108 allows the phases of the clock signal CLX and the inverted clock signal CLXB to be in an inverted phase relation.

The phase difference compensation circuit 108 includes a first buffer circuit 501, a bistability circuit 502, and a second buffer circuit 503. The first buffer circuit 501 is constructed with inverters 501a and 501b, the bistability circuit 502 is constructed with inverters 502a and 502b, and the second buffer circuit 503 is constructed with inverters 503a, 503a', 503b, and 503b'. In one-side transistor constituting each inverter, a source thereof is applied with a power VSSX2. In other-side transistor, a drain thereof is applied with a power VDDY2. On the other hand, the circuit construction of the phase difference compensation circuit 108 shown in FIG. 5 is simply an example, but other construction may be employed.

In a case where a phase difference between the phases of the inverted clock signal CLXB and the clock signal occurs, the bistability circuit 502 compensates for the phase difference. The phase difference compensation circuit 108 has a construction for removing the phase difference by providing a transistor driving performance of the circuit for applying the clock signal CLX and the inverted clock signal CLXB to the buffer circuit 501 constructed with the inverters 501a and 501b and by applying an output of the one-side inverter 502a of the bistability circuit 502 to an input of the other-side inverter 502b thereof and applying an output of the other-side inverter 502b to an input of the one-side inverter 502a, thereby providing a positive feedback to the input signal inverters 502a and 502b.

In addition, the bistability circuit 502 is followed by the second buffer circuit 503. By the operation of the second buffer circuit 503, deterioration in drive performance of the bistability circuit 502 can be prevented. More specifically, the second buffer circuit 503 prevents the deterioration in drive performance of the bistability circuit 502 and reduces deterioration of the clock signal CLX and the inverted clock signal CLXB caused by capacitances of the signal lines for applying the clock signal CLX and the inverted clock signal CLXB, for example, in a case where the clock signal CLX and the inverted clock signal CLXB are applied from the bistability circuit 502.

In order to prevent the deterioration in drive performance of the bistability circuit 502, on-resistance values of the inverters 503a, 503a', 503b, and 503b' of the second buffer circuit 503 need to be set to as a low value as possible. Similarly, in order to prevent the deterioration in drive performance of the first buffer circuit 501, on-resistance values of the inverters 502a and 502b of the bistabllity circuit 502 need to be set to as a low value as possible. For the reason, like the embodiment, in a construction where a plurality of inverters are connected in cascade, the channel lengths of the transistors constituting each inverter may be designed to be equal, and gate widths W of the transistors constituting the inverters in latter stages may be designed to be larger. As shown in FIG. 5, in the embodiment, the gate widths W of the transistors constituting the inverters are designed to 100 μm, 200 μm, 500 μm, and 1500 μm in the order of from the front stage to the final stage. Particularly, the gate width of the transistors in the final stage is designed to be largest.

The scan line driver circuits 104 are driven by applying the power VDDY and VSSY. In order to scan a plurality of pixel electrodes 9a arrayed in matrix in an arrayed direction of the scan lines 11a by using the data signals and scan signals, the scan line driver circuits 104 are designed to sequentially apply the scan signals which are generated based on a Y-side clock signal CLY (and an inverted signal CLY' thereof) (that is, a reference clock for applying the scan signals) and a shift register start signal DY to a plurality of the scan lines 11a.

At this time, in FIG. 3, the scan lines 11a are simultaneously applied with voltages from both sides. In addition, the scan line driver circuits 104 are applied with enable signals ENBY for wave-shaping the scan signals. Here, since the frequencies of the scan signals output from the scan line driver circuits 104 and the frequencies of the transmission signals Pi and the sampling pulses Si processed by or output from the data line driver circuit 101 are different from each other to a degree that interference does not occur therebetween, the scan line driver circuits 104 and the logic circuit 52 may be commonly applied with the powers VDDX3 and VSSX3 and the powers VDDY and VSSY. More specifically, as a example, the scan line driver circuits 104 are applied with a clock signal CLY having a frequency of several tens kHz, and the data line driver circuit 101 is applied with a clock signal CLX having several MHz. The frequencies of the clock signals are very different from each other.

In the circuits operating according to the clock signals having such a frequency difference, even in a case where the powers are commonly used, it is possible to reduce the occurrence of waveform deformation caused by clock noise down to a level that there are no problems in practical use. Therefore, by commonly using the powers VDDY and VSSY and the powers VDDX3 and VSSX3, the number of power supplies can be reduced in comparison with a case where the circuits are supplied with separate powers, so that the circuit construction can be simplified. In addition, in comparison with a case where wire lines are provided in proportion to the number of power systems in order to supply multiple-system powers, deformation of signals caused by the interference between the wire lines can be reduced.

In addition, various timing signals such as clock signals CLX and CLY are generated by a timing generator disposed in an external circuit (not shown) and applied through external circuit connection terminals to the circuits on the TFT array substrate 10. In addition, power voltages required to drive the driver circuits are also supplied from the external circuit. In addition, the signal lines led from the up-down conduction terminals 106 are supplied with an opposite electrode potential LCC from the external circuit. The opposite electrode potential LCC is applied through the up-down conduction terminals 106 to the opposite electrode 21. The opposite electrode potential LCC is used as a reference potential of the opposite electrode 21 for suitably maintaining a potential difference with respect to the pixel electrodes 9a to for a liquid crystal storage capacitance.

In the liquid crystal device 1 according to the embodiment, the circuits included in the data line driver circuit 101, more particularly, the shift register 51, the phase difference compensation circuit 108, and the logic circuit S2 are driven by the multiple-system powers VDDX1, VSSX1, VDDX2, VSSX2, VDDX3, and VSSX3. Therefore, as described later with reference to FIG. 6, other circuits including in the liquid crystal device 1 excluding the shift register 51 can output signals with predetermined waveforms at predetermined timings without influence of the clock signal CLX and the inverted clock signal CLXB applied to the shift register 51.

In addition, in the embodiment, since the shift register 51 and the phase difference compensation circuit 108 are operated by using the same clock signal CLX, the distortion in waveforms of various signals caused from the influence of the clock noise propagated between the phase difference compensation circuit 108 and the logic circuit 52 or between the shift register 52 and the logic circuit 52 can be lowered in comparison with the distortion in waveforms caused from the influence of the clock noise propagated between the phase difference compensation circuit 108 and the shift register 51. Therefore, even in a case where the powers VDDX1 and VSSX1 and the powers VDDX2 and VSSX2 are used as common powers, the distortion of the sampling pulses Si output from the logic circuit 52 can be suitably reduced. By doing so, since the image signals can be applied to the pixel portions with suitable waveforms at suitable timings, stripe-shaped irregularity or band-shaped irregularity in the image display regions can be reduced. As a result, a high quality image display of the electro-optical device can be implemented.

Figure 6:
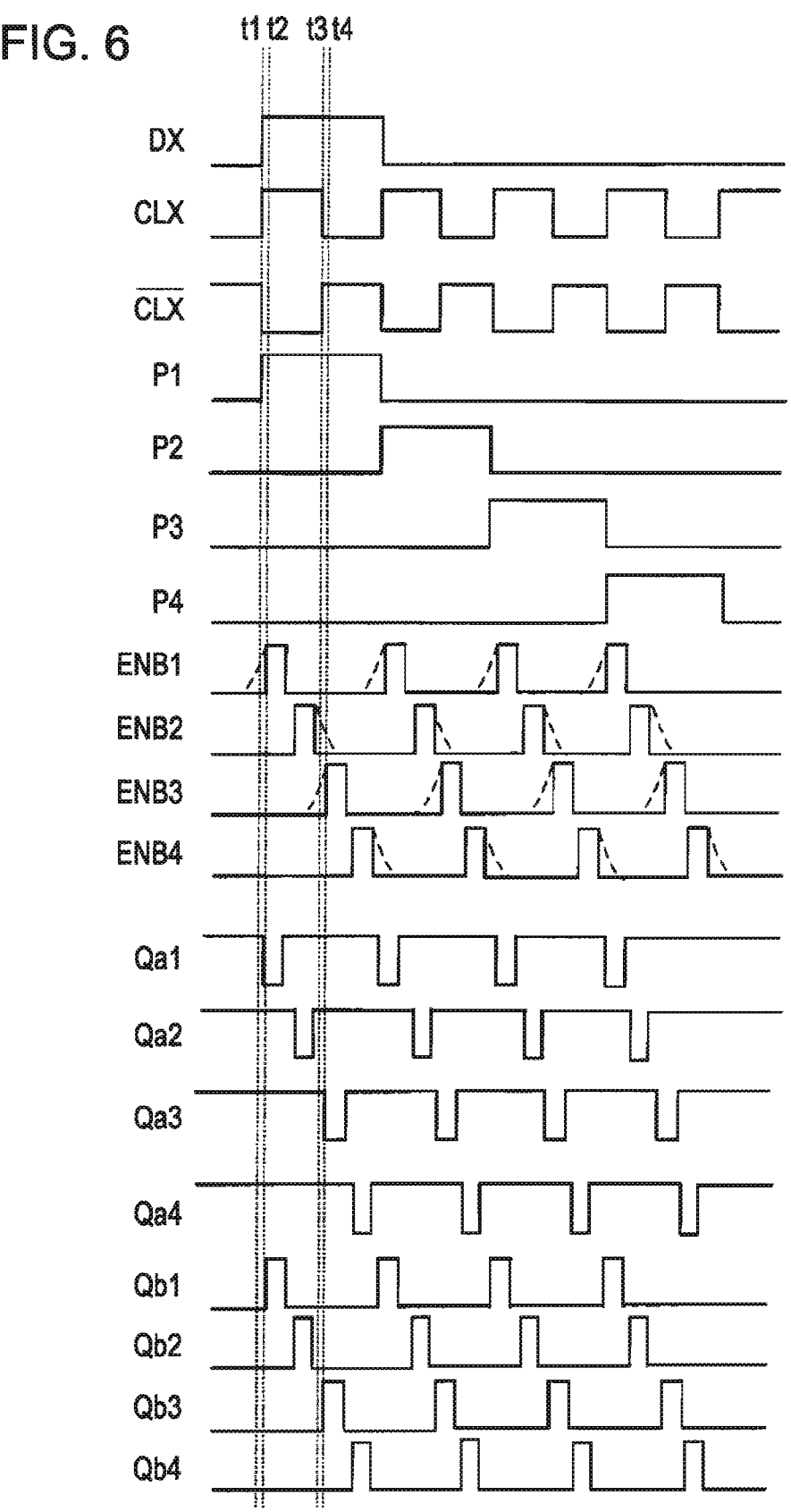
FIG. 6 is a timing chart showing waveforms of signals in operations of a liquid crystal device.

Now, advantages which are obtained by driving the circuits constituting the data line driver circuit 101 with different power supplies will be described in detail with reference to FIG. 6. FIG. 6 is a timing chart for explaining operations of a liquid crystal device. In FIG. 6, for the convenience of description, four transmission signals Pi, four wave-shaped signals Qai, and four output signals Qbi are shown, but the signals corresponding to the number of stages of the shift register 51 may be output.

Referring to FIG. 6, at a timing t1, the start pulse DX and the clock signal CLX rise. At this time, the inverted clock signal CLXB falls from a predetermined potential to a lower potential, and the transmission signal P1 is output from the shift register 51. Next, at a timing t2 which slightly proceeds from the timing t1, the enable signal ENB1 is applied to the logic circuit 52. Here, if the powers VDDX1 and VSSX1 and the powers VDDX3 and VSSX3 are supplied by a common power supply, as shown with a dotted line in the figure, the distortion in waveform of the enable signal ENB1 caused by the influence of the clock noise may occur at a rising time of the enable signal ENB1. In addition, the distortion in waveform of the falling enable signal ENB2 caused from the clock signal CLX and the inverted clock signal CLXB may occur at a timing t4 which slightly proceeds from a timing t3 that the clock signal CLX falls.

Similarly, the distortion in waveforms of the enable signals ENB3 and ENB4 may occur according to rising or falling of the clock signal CLX and inverted clock signal CLXB. The function of the enable signals is to limit pulse widths of the transmission signals Pi, thereby finally outputting the sampling pulses Si from the sampling circuit 7 as pulse signals in a predetermined interval without distortion in waveforms thereof. Therefore, when the distortion in waveforms of the enable signals occurs, the distortion in intervals and waveforms of the sampling pulses Si occur, so that the display performance of the liquid crystal device 1 deteriorates.

Particularly, in the liquid crystal device 1 according to the embodiment, since the circuits constituting the data line driver circuit 101 are driven with different power supplies, the propagation of the clock noise caused by the clock signal CLX and the inverted clock signal CLXB through the power supplies into the data line driver circuit 101 can be reduced, and the wave-shaped signals Qai and the output signals Qbi with reduced distortion thereof can be output according to the enable signals ENB1 to ENB4. Therefore, in the liquid crystal device 1 according to the embodiment, defects of image display such as stripe-shaped brightness irregularity caused by the clock noise can be reduced, so that it is possible to improve display characteristics of the liquid crystal device 1.

Figure 7:
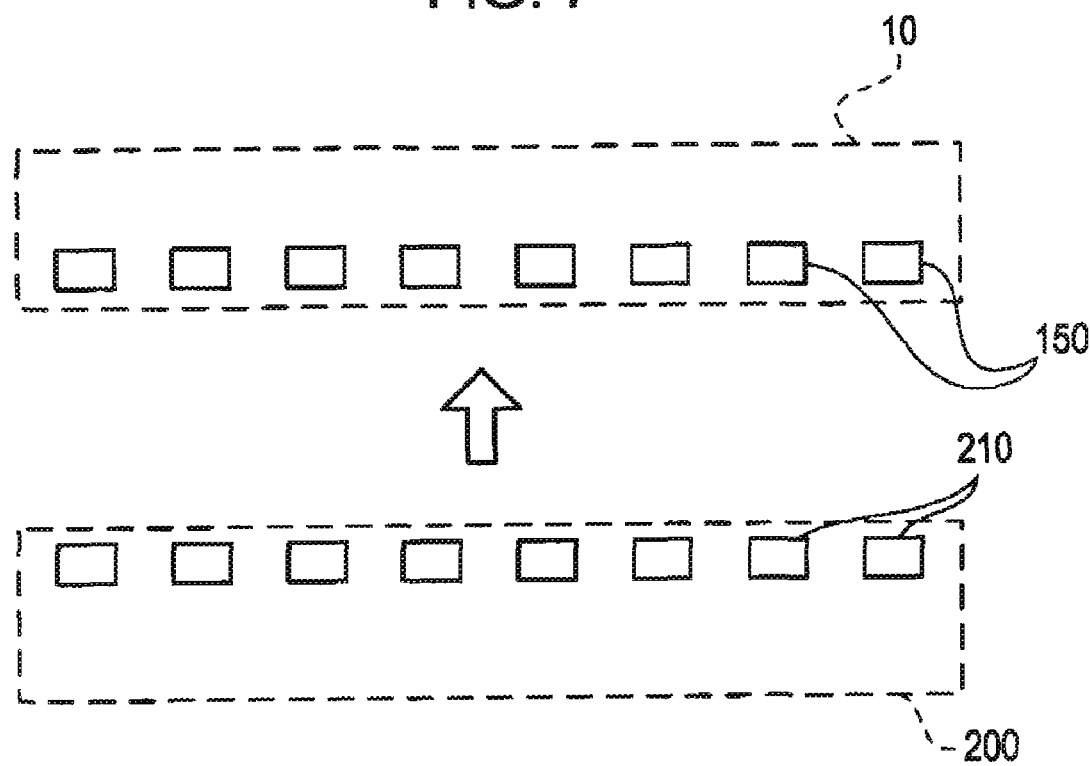
FIG. 7 is a schematic layout view showing a layout of terminal portions disposed on a TFT array substrate and a layout of power supply units disposed in an FPC.
Figure 8:
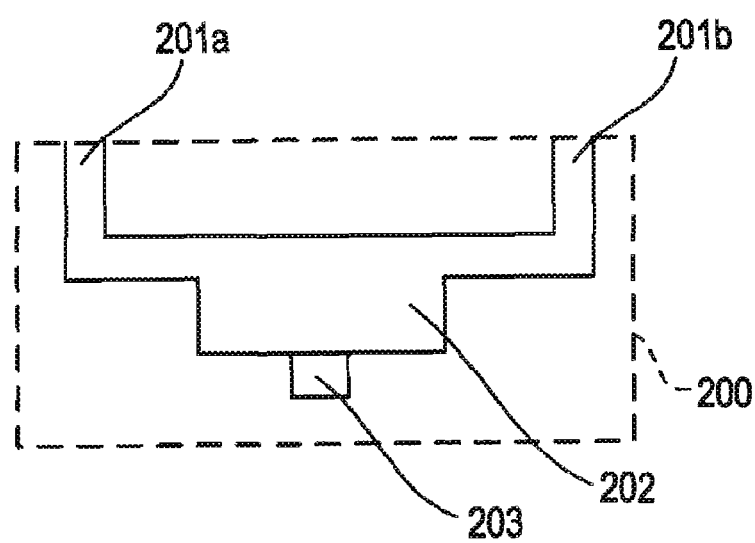
FIG. 8 is a schematic plan view showing a modified example of one of power supply units disposed in FPC.

Now, a layout of terminal portions for supplying powers and a construction of power supply units disposed in FPC as an example of an "external power supply" for supplying the powers to the terminal portions according to the invention will be described with reference to FIGS. 7 and 8. FIG. 7 is a schematic layout view showing a layout of the terminal portions disposed on the TFT array substrate and a layout of the power supply units disposed in the FPC. FIG. 8 is a schematic plan view showing a modified example of one of the power supply units disposed in the FPC.

Referring to FIG. 7, the terminal portions 150 are disposed along a periphery of the TFT array substrate 10. The terminal portions 150 are provided corresponding to the powers VDDX1 to VDD3, VSSX1 to VSSX3, VDDY, and VSSY, and the powers are supplied through power supply lines (not shown) electrically connected to the terminal portions to the circuits. Therefore, the terminal portions 150 and the power supply lines are not electrically connected to each other between the different power supplies, the propagation of the clock noise through the terminal portions or the power supply lines between the circuits can be reduced.

The power supply units 201 disposed in the FPC 200 are designed to be disposed in accordance with a layout of the terminal portions 150, that is, power supply sources. The FPC 200 is a connector for connecting the power supply sources to the TFT array substrate 10. In the embodiment, since the power supply units 201 are separately provided to the power supplies in the FPC 200 in advance, the propagation of the clock noise through the FPC 200 between the circuits included in the data line driver circuit 101 can be reduced.

In FIG. 8, the power supply units 201a and 201b are electrically connected through conductive portions 203 and 202 to a common power supply. When the FPC 200 and the TFT array substrate 100 are electrically connected, the power supply units 201a and 201b are connected to different terminal portions 150. Namely, one-system power is divided into the power supply units 201a and 201b disposed in the FPC 200, and the common power is supplied to the terminal portions 150 electrically connected to the divided power supply units 201a and 201b. Here, the conductive portion 202 is formed to have a larger width than the conductive portion 203 and the power supply units 201a and 201b so as to reduce electric resistance in an S power supply lines. According to the power supply units 201a and 201b, since the noise of the power supply signals caused by the large electric resistance of the FPC 200 can be reduced, it is possible to suppress deterioration in display characteristics caused by the noise.

As described above, in the electro-optical device according to the embodiment, the circuits constituting the electro-optical device can output various signals with predetermined waveforms at predetermined timings, it is possible to suppress deterioration in image quality caused by the clock noise. As a result, in the electro-optical device according to the embodiment, defects of image display such as stripe-shaped brightness irregularity can be reduced, so that it is possible to improve display characteristics.

Figure 9:
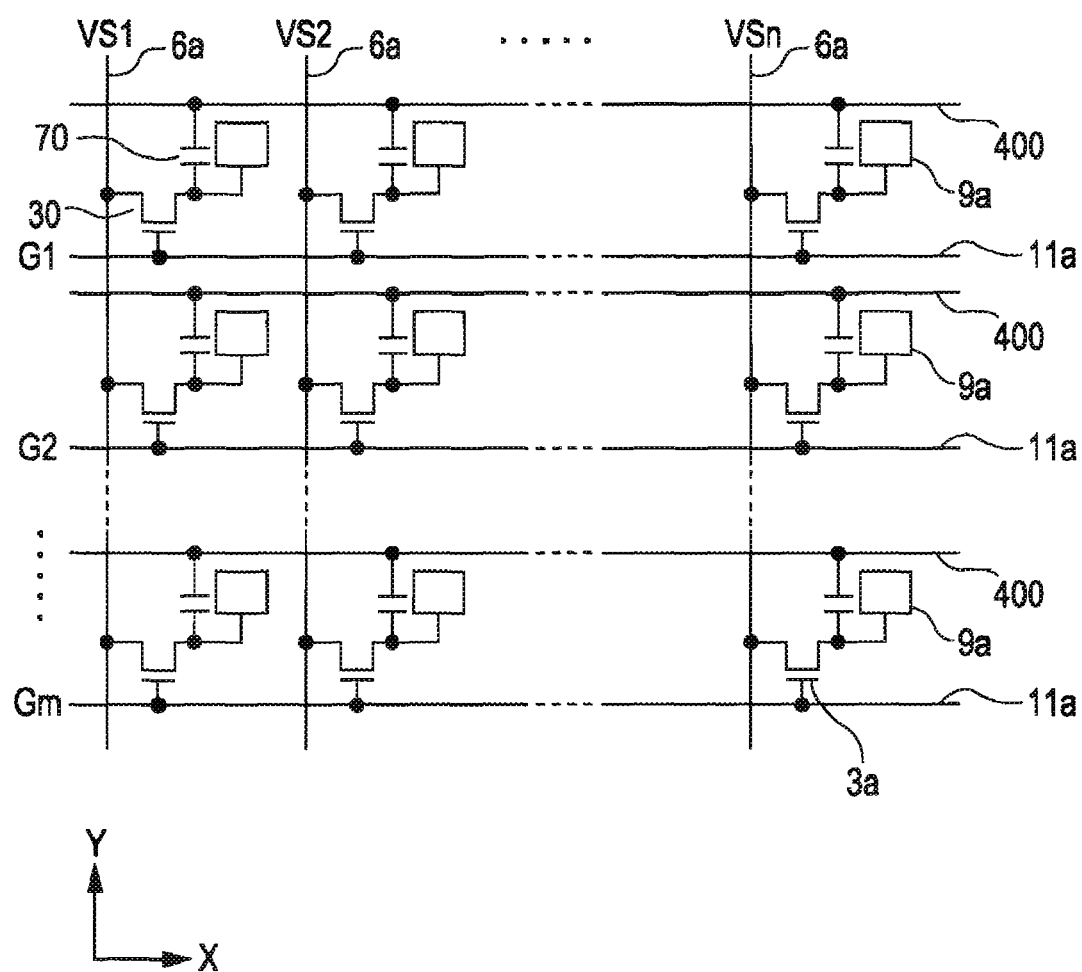
FIG. 9 is an equivalent circuit diagram showing various devices and wire lines in a plurality of pixels disposed in matrix constituting an image display region of a liquid crystal device.
Figure 10:
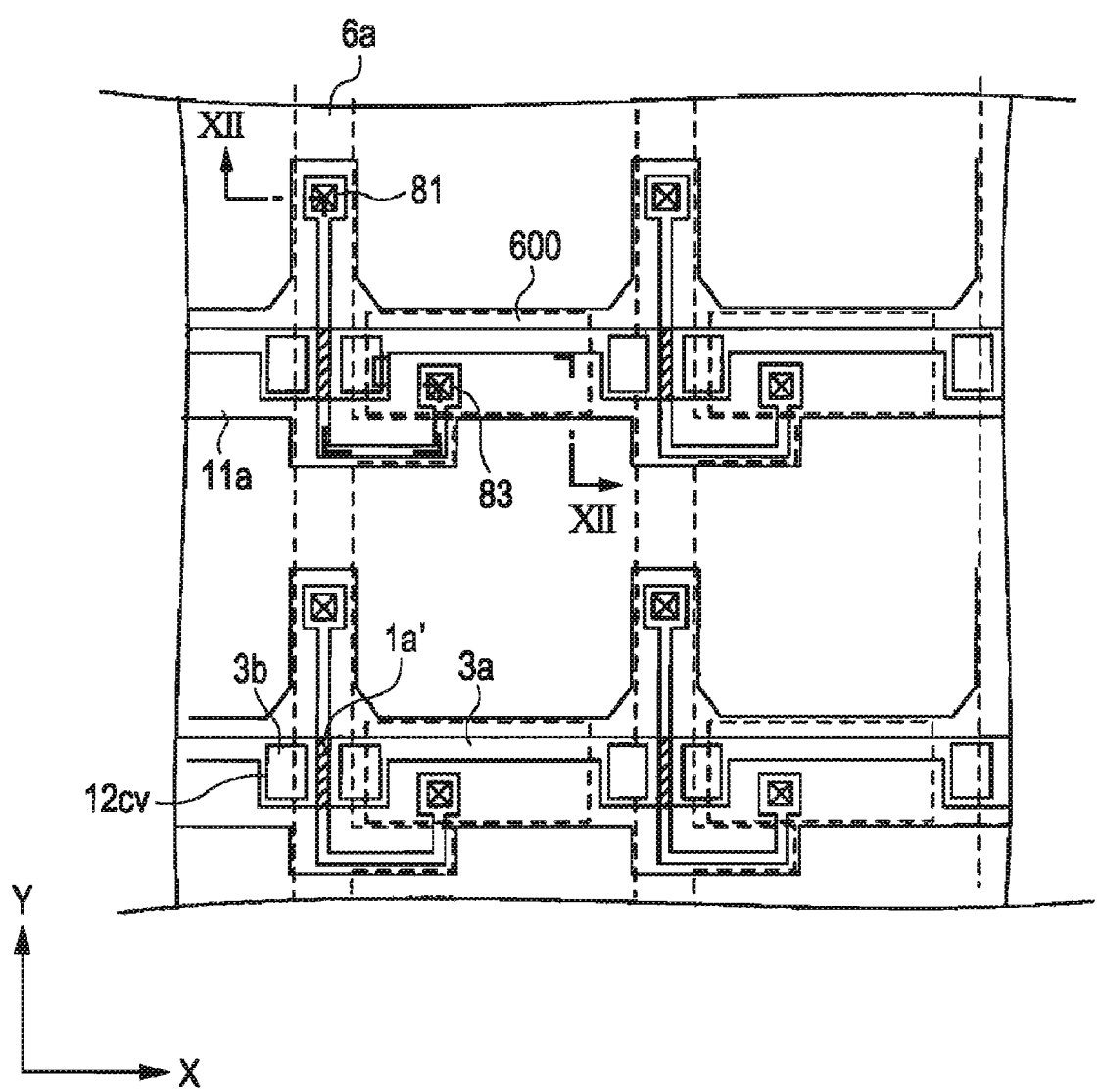
FIG. 10 is a plan view showing a partial construction related to pixel portions on a TFT array substrate, wherein the figure corresponds to a lower layer portion (down to a lower layer portion indicated with reference numeral 6a (data line) in FIG. 12) of a stacked structure.
Figure 11:
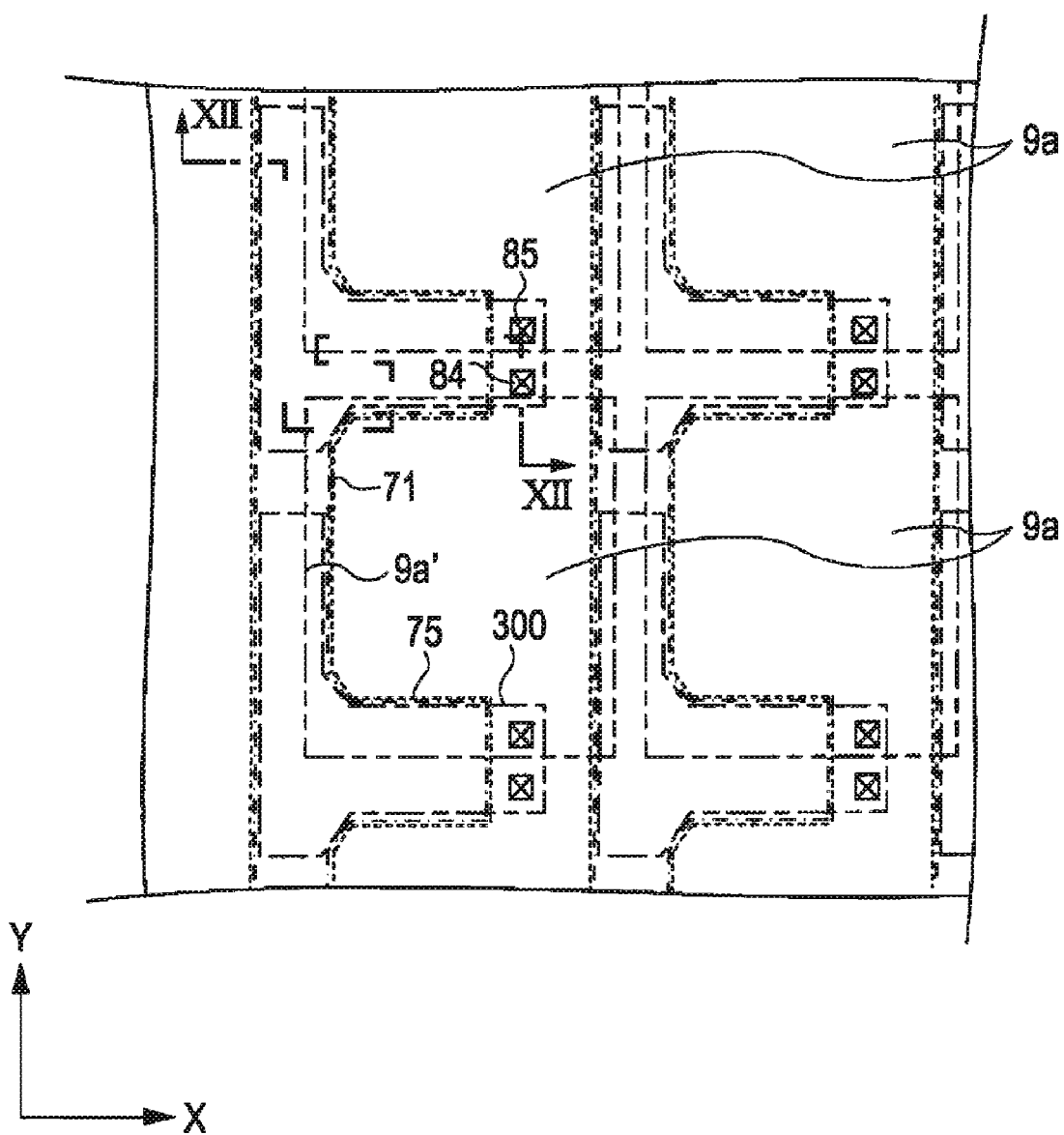
FIG. 11 is a plan view showing a partial construction related to pixel portions on a TFT array substrate, wherein the figure corresponds to a upper layer portion (up to an upper layer portion indicated with reference numeral 6a (data line) in FIG. 12) of a stacked structure.
Figure 12:
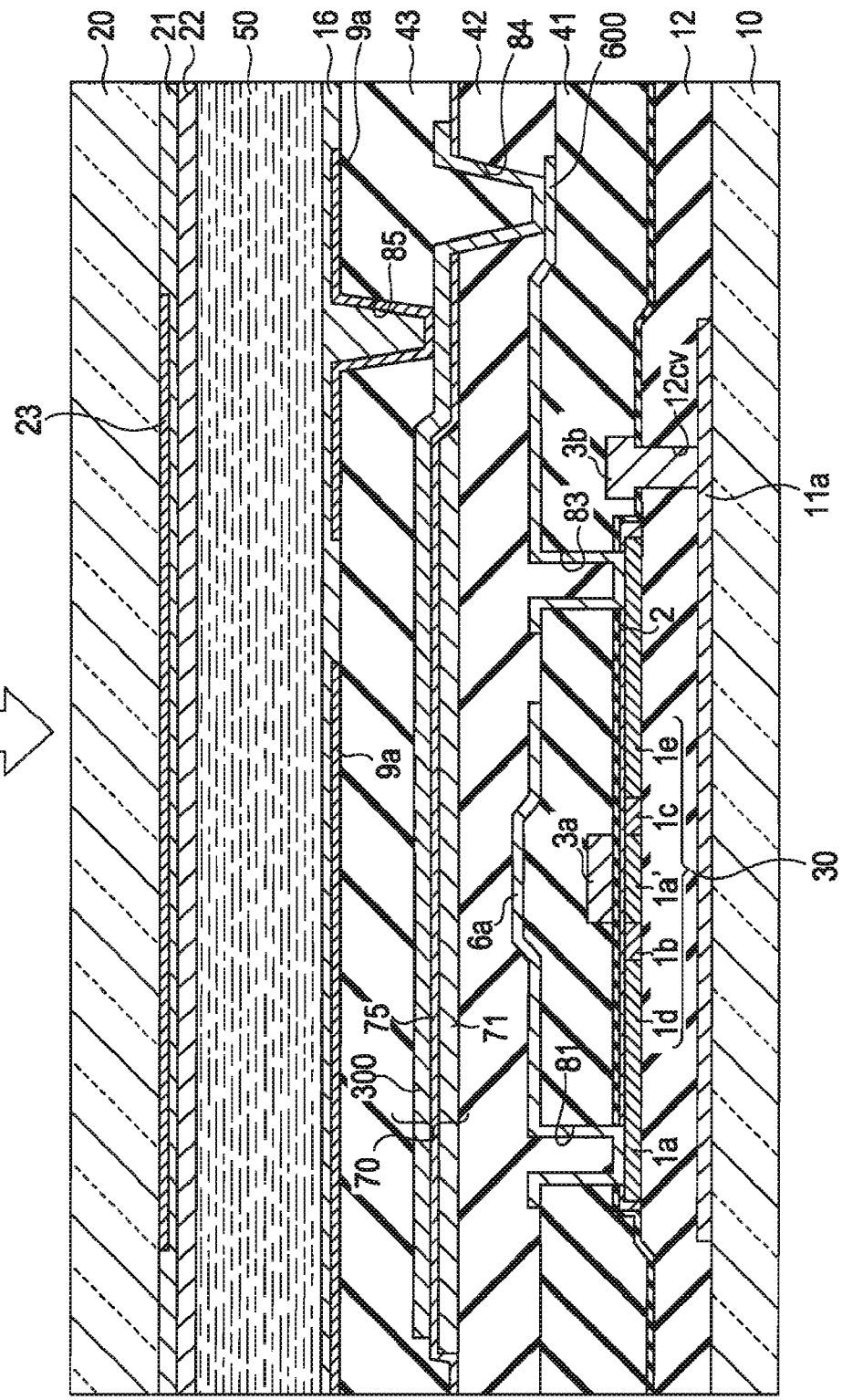
FIG. 12 is a cross-sectional view taken along line A-A' in a case where the views of FIGS. 10 and 11 are overlapped with each other.

Now, a construction of pixel portions of the liquid crystal device according to the embodiment will now be described with reference to FIGS. 9 to 12. FIG. 9 is an equivalent circuit diagram showing various devices and wire lines in a plurality of pixels disposed in matrix constituting an image display region of a liquid crystal device. FIGS. 10 and 11 are plan views showing components relating to pixel portions on a TFT array substrate, wherein FIG. 10 corresponds to a lower layer portion of a stacked structure, and FIG. 11 corresponds to an upper layer portion of a stacked structure. FIG. 12 is a cross-sectional view taken along line A-A' when the diagrams of FIGS. 10 and 11 are overlapped with each other. In FIG. 12, different scales are used for layers and elements in order to show the layers and the elements in a recognizable size in the figure.

Fundamental Construction of Pixel Portions

Referring to FIG. 9, each of the pixels disposed in matrix in the image display region of the liquid crystal device according to the embodiment includes a pixel electrode 9a and a TFT 30 for controlling a pixel electrode 9a, and a data line 6a for applying an image signal is electrically connected to a respective source of the TFT 30. Image signals VS1, VS2, ..., and VSn written to the data lines 6a may be line-sequentially applied in this order. Otherwise, the image signals may be applied to groups consisting of a plurality of adjacent data lines 6a.

In addition, scan lines 11a are electrically connected to the gates of the TFTs 30, and the scan signals G1, G2, ..., and Gm are line-sequentially applied to the scan lines 11a in this order in a pulse wise at predetermined timings. The pixel electrodes 9a are electrically connected to the drains of the TFT 30. The image signals VS1, VS2, ..., and VSn applied from the data lines 6a are written at predetermined timings by closing the switches of the TFTs 30, that is, switching devices, in a predetermined time period.

The image signals VS1, VS2, ..., and VSn having a predetermined level, written to a liquid crystal through the pixel electrodes 9a, are sustained in combination with the opposite electrodes formed in the opposite substrate. The liquid crystal enables grayscale display by changing alignment or arrangement of a molecular group using a voltage level applied thereto so as to modulate light. In a normally white mode, the transmittance for incident light decreases as the voltage applied in units of pixel increases. In a normally black mode, the transmittance for incident light increases as the voltage applied in units of pixel increases. As a result, the light having a contrast based on an image signal is emitted from the liquid crystal device.

In order to prevent leakage of the retained image signals, a storage capacitor 70 is attached in parallel to a liquid crystal capacitor formed between the pixel electrode 9a and the opposite electrode. One electrode of the storage capacitor 70 is connected to the drain of the TFT 30 in parallel with the pixel electrode 9a, and the other electrode is connected to a capacitance wire line 400 having a fixed potential to provide an electrostatic potential.

Detailed Construction of Pixel Portions

Now, a construction of pixel portions implementing the aforementioned operation will now be described in detail with reference to FIGS. 10 to 12.

FIGS. 10 to 12 show circuit elements of the aforementioned pixel portions formed on a TFT array substrate 10 as a patterned and stacked conductive film. The TFT array substrate 10 may be constructed with, for example, a glass substrate, a quartz substrate, an SOI substrate, a semiconductor substrate, or the like, and be disposed to face an opposite substrate 200 which may be constructed with, for example, a glass substrate or a quartz substrate. In addition, the circuit elements include a first layer including scan lines 11a or the like, a second layer including TFTs 30 or the like, a third layer including data lines 6a or the like, a fourth layer including storage capacitors 70 or the like, and a fifth layer including pixel electrodes 9a or the like. In addition, a short circuit of the aforementioned elements is prevented by disposing a base insulating film 12 between the first and second layers, a first interlayer insulating film 41 between the second and third layer, a second interlayer insulating film 42 between the third and fourth layers, and a third interlayer insulating film 43 between the fourth and fifth layers. In addition, the first to third layers are shown as a lower layer portion in FIG. 10, and the fourth to fifth layers are shown as an upper layer portion in FIG. 11.

Construction of First Layer: Scan Lines or the Like

The first layer includes scan lines 11a. Scan lines 11a are patterned in a shape including a main line portion extending in an X-direction of FIG. 10 and a protrusion extending in a Y-direction of FIG. 10 similar to the data lines 6a. The scan lines 11a may made of, for example, conductive polysilicon, a metal including at least one of refractory metals such as titanium (Ti), chrome (Cr), tungsten (W), tantalum (Ta), and molybdenum (Mo), an alloy thereof, a metal silicide, a polysilicide, or a stacked structure thereof.

The scan lines 11a are disposed to cover regions facing the channel regions 1a' in the lower layer portions of the TFTs 30 and are formed of a conductive film.

Construction of Second Layer: TFTs or the Like

The second layer includes TFTs 30. The TFT 30 has, for example, an LDD (lightly doped drain) structure, and includes a gate electrode 3a, a semiconductor layer 1a, an insulating film 2 including a gate insulating film insulating the gate electrode 3a and the semiconductor layer 1a. The gate electrode 3a is made of, for example, conductive polysilicon. The semiconductor layer 1a is made of, for example, polysilicon, and includes a channel region 1a', a lightly-doped source region 1b, a lightly-doped drain region 1c, a heavily-doped source region 1d, and a heavily-doped drain region 1e. In addition, although the TFT 30 preferably has an LDD structure, the TFT 30 may have an offset structure in which impurities are not injected into the lightly-doped source region 1b and the lightly-doped drain region 1c, or may be a self-aligned type in which a high concentration of impurities are injected using the gate electrode 3a as a mask to provide the heavily-doped source region and the heavily-doped drain region.

A part 3b of the gate electrode 3a of the TFT 30 is electrically connected to the scan line 11a through a contact hole 12cv formed in the base insulating film 12. The base insulting film 12 is constructed with, for example, a silicon oxide film. Since the base insulation film 12 is formed on the entire surface of the TFT array substrate 10, in addition to a interlayer insulation function between the first and second layers, the base insulating film has a function of preventing variation in device characteristics of the TFT 30 which is caused by roughness or contamination generated by grinding a substrate surface.

On the other hand, although the TFT 30 according to the embodiment is a top gate type, the TFT 30 may be a bottom gate type.

Construction of Third Layer: Data Lines or the Like

The third layer includes data lines 6a and intermediate layers 600.

The data line 6a is constructed with a three-layered film including an aluminum layer, a nitride titanium layer, and a nitride silicon layer in the order of from the bottom. The data line 6a is formed to partially cover the channel region 1a of the TFT 30. For this reason, it is possible to block the incident light from an upper side from propagating into the channel region 1a' of the TFT 30 by using the data line 6a that can be disposed in proximity of the channel region 1a'. In addition, the data line 6a is electrically connected to the heavily-doped source region 1d of the TFT 30 through the contact hole 81 passing through the first interlayer insulating film 41.

In addition, a portion of the data line 6a facing the channel region 1a may be provided with a conductive film having a lower reflectance in comparison with a conductive film such an aluminum film constituting a main body of the data line 6a. As a result, the aforementioned returning light is reflected on a surface of the data line 6a facing the channel region 1a, that is, a surface of a lower layer of the data line 6a, so that it is possible to prevent occurrence of multi-reflected light or stray light. Therefore, it is possible to reduce influence of the light to the channel region 1a. Such a data line 6a may be constructed by forming metal or barrier metal made of a material having a lower reflectance than that of the aluminum film constituting a main body of the data line 6a on a surface of the data line 6a facing the channel regions 1a, that is, a surface of a lower layer of the data line 6a. In addition, as a metal or a barrier metal having a lower reflectance than that of the aluminum film, chrome (Cr), titanium (Ti), nitride titanium (TiN), or tungsten (W) may be used.

The intermediate layer 600 is constructed with the same film as the data line 6a. As shown in FIG. 10, the intermediate layer 600 and the data line 6a are separated from each other. In addition, the intermediate layer 600 is electrically connected to the heavily-doped drain region 1e of the TFT 30 through a contact hole 83 passing through the first interlayer insulating film 41.

The first interlayer insulating films 41 is made of, for example, NSG (non-silicate glass). In addition, the first interlayer insulating films 41 may be formed of silicate glass such as PSG (phosphorus silicate glass), BSG (boron silicate glass), BPSG (boron phosphorus silicate glass), a silicon nitride, and a silicon oxide.

Construction of Fourth Layer: Storage Capacitor or the Like

The fourth layer includes storage capacitors 70. The storage capacitors 70 are constructed by using the capacitor electrode 300 as an example of an "upper electrode" according to the invention, the lower electrode 71 as an example of a "lower electrode" according to the invention, a dielectric film 75 as an example of an "interlayer insulating film" according to the invention interposed therebetween.

The extension of the capacitor electrode 300 is electrically connected to the intermediate layer through a contact hole 84 passing through the second interlayer insulating film 42.

The capacitor electrode 300 or the lower electrode 71 is made of, for example, a metal including at least one of refractory metals such as Ti, Cr, W, Ta, and Mo, an alloy thereof, a metal silicide, a polysilicide, or a stacked structure thereof, or preferably, a tungsten silicide.

As shown in FIG. 11, the dielectric films 75 are formed in non-opening regions disposed between opening regions of each pixel in a plan view of the TFT array substrate 10. Namely, the dielectric films 75 are not formed in the opening regions. The dielectric films 75 are formed of a silicon nitride film having a high dielectric constant without considering transmittance. In addition to the silicon nitride film, the dielectric films may be constructed with, for example, a single-layered film or a multilayered film of hafnium ($HfO_2$), alumina ($Al_2O_3$), tantalum oxide ($Ta_2O_5$), or the like.

The second interlayer insulating films 42 are made of, for example, NSG. In addition, the second interlayer insulating films 42 may be made of silicate glass such as PSG, BSG, and BPSG, a silicon nitride, and a silicon oxide. The surface of the second interlayer insulating films 42 is planarized by using a planarization process such as a chemical mechanical polishing (CMP) process, a grinding process, a spin coat process, and a concave portion burying process. Therefore, protrusions generated by these elements on a lower layer are removed, so that the surface of the second interlayer insulating film 42 is planarized. In addition, such a planarization may be performed for other interlayer insulating films.

Construction of Fifth Layer: Pixel Electrodes or the Like

The third interlayer insulating films 43 are formed on the entire surface of the fourth layer, and then, pixel electrodes 9a are formed as a fifth layer. The third interlayer insulating films 43 are made of, for example, NSG. In addition, the third interlayer insulating films 43 may be made of silicate glass such as PSG, BSG, and BPSG, a silicon nitride, a silicon oxide, or the like. Similar to the second interlayer insulating films 42, the surface of the third interlayer insulating films 43 is planarized by using a CMP process or the like.

The pixel electrodes 9a (contours indicated with a dashed line 9a' in FIG. 11) are arranged in each of the pixel regions which are horizontally and vertically partitioned and arrayed. The data lines 6a and the scan lines 11a are formed in the boundaries of the pixel electrodes 9a to be arranged in the shape of a lattice. In addition, the pixel electrodes 9a are constructed with, for example, a transparent conductive film such as TO (indium tin oxide).

The pixel electrode 9a is electrically connected to the extension of the capacitor electrode 300 through a contact hole 85 passing through the interlayer insulating film 43 (see FIG. 12). Therefore, the potential of the capacitor electrode 300, which is a conductive film under the pixel electrode 9a, is at the same level as the pixel potential. As a result, the pixel potential is not influenced by an adverse effect during operation of the liquid crystal device due to parasitic capacitance between the pixel electrode 9a and its underlying conductive film.

As described above, the extension of the capacitor electrode 300 and the intermediate layer 600 are electrically connected to each other through the contact hole 84, and the intermediate layer 600 and the heavily-doped drain region 1e of the TFT 30 are electrically connected to each other through the contact hole 83, respectively. Namely, the pixel electrode 9a and the heavily-doped drain region 1e of the TFT 30 are connected to each other through the intermediate layer 600 and the extension of the capacitor electrode 300.

An alignment layer 16, on which a predetermined alignment such as a rubbing process is performed, is provided on the pixel electrode 9a.

Hereinbefore, the construction of the pixel portions disposed on the TFT array substrate 10 have been described.

On the other hand, the opposite electrode 21 is provided on the entire surface of the facing surface of the opposite substrate 20, and alignment layer 22 is provided thereon (under the opposite electrode 21 in FIG. 12). Similar to the pixel electrode 9a, the opposite electrode 21 is constructed with, for example, a transparent conductive film such as ITO. In addition, a light-blocking film 23 is disposed between the opposite substrate 20 and the opposite electrode 21 to cover at least a region facing the TFT 30 in order to avoid a light leakage current in the TFT 30.

In this structure, a liquid crystal layer 50 is disposed between the TFT array substrate 10 and the opposite substrate 20. The liquid crystal layer 50 is formed by injecting a liquid crystal material into a space formed by sealing peripherals of the substrates 10 and 20 with a seal member. The liquid crystal layer 50 has a predetermined alignment by virtue of the alignment layers 16 and 22, on which an alignment process such as a rubbing process is performed with no electric field applied between the pixel electrode 9a and the opposite electrode 21.

The aforementioned construction of the pixel portions is common to each pixel portion as shown in FIGS. 10 and 11. The pixel portions are formed in the aforementioned image display region 10a (see FIG. 1) at regular intervals.

Figure 13:
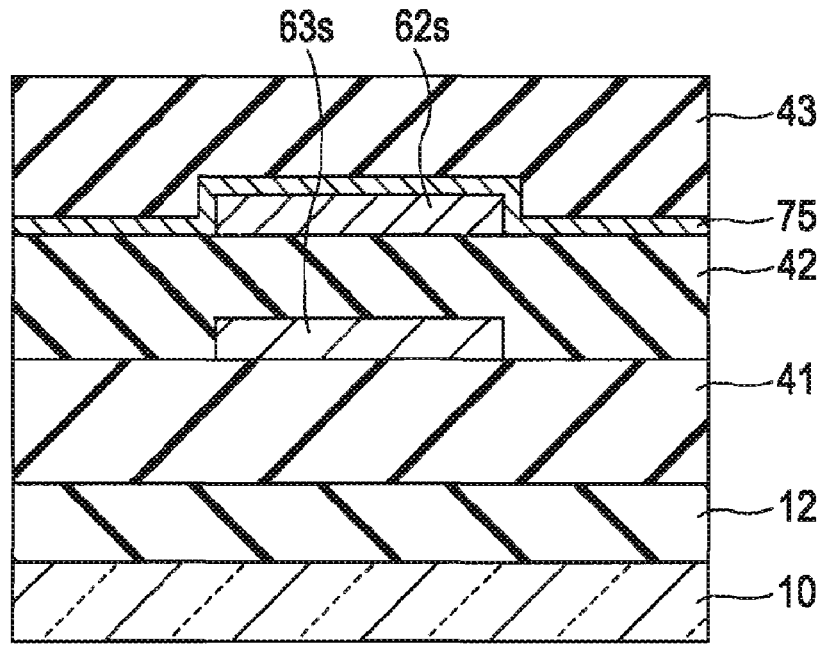
FIG. 13 is a cross-sectional view showing a stacked structure in a portion where a power supply lines for supplying powers to a phase difference compensation circuit and a logic circuit are partially overlapped with each other in a plan view of a substrate.
Figure 14:
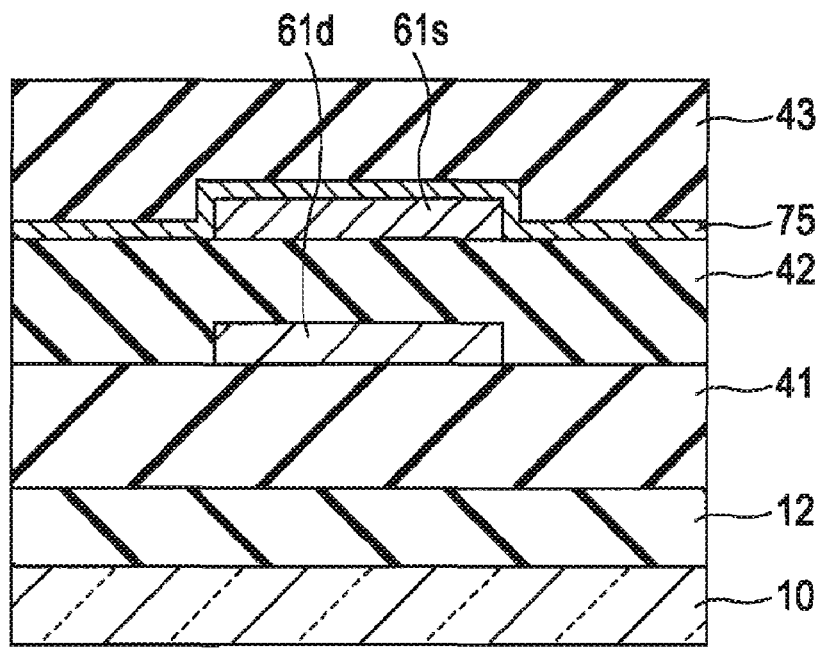
FIG. 14 is a cross-sectional view showing a stacked structure in a portion where a high potential power line and a lower potential power supply line to the shift register are partially overlapped with each other in a plan view of a substrate.

Now, the power supply lines of the liquid crystal device according to the embodiment will be described in detail with reference to FIGS, 3 and 12 to 14. FIG. 13 is a cross-sectional view showing a stacked structure in a portion where the power supply lines for supplying powers to the phase difference compensation circuit and the logic circuit are partially overlapped with each other in a plan view of the substrate. FIG. 14 is a cross-sectional view showing a stacked structure in a portion where a high potential power line and a lower potential power supply line to the shift register are partially overlapped with each other in a plan view of the substrate.

Referring to FIG. 3, in the liquid crystal device according to the embodiment, as described above, the data line driver circuit 101 is supplied with multiple-system powers. The data line driver circuit 101 includes the shift register 51, the logic circuit 52, and the phase difference compensation circuit 108, and these circuits are supplied with separate systemic powers. Namely, the shift register 51 is supplied with the powers VDDX1 and VSSX1 through the power supply lines 61d and 61s, respectively. The logic circuit 52 is supplied with the powers VDDX3 and VSSX3 through the power supply lines 63d and 63s, respectively. The phase difference compensation circuit 108 is supplied with the powers VDDX2 and VSSX2 through the power supply lines 63d and 63s, respectively.

As shown in FIG. 13, in the liquid crystal device according to the embodiment, particularly, the power supply lines 63s and 62s are formed with conductive films which are disposed in separate layers with the second interlayer insulating film 42 interposed therebetween. Similarly, although not shown, the power supply lines 63d and 62d are also formed with conductive films which are disposed in separate layers with the second interlayer insulating film 42 interposed therebetween. Therefore, in comparison with a case where the power supply lines 63s and 62s or the power supply lines 63d and 62d are formed with a single conductive film, a degree of a freedom in design for layout and wiring is heightened. In addition, as shown in FIG. 3, the power supply lines 63s and 62s or the power supply lines 63d and 62d are partially overlapped with each other in a plan view of the TFT array substrate 10. Therefore, it is possible to reduce an area required for wiring the power supply lines 63s and 62s or the power supply lines 63d and 62d on the TFT array substrate 10. As a result, a size of the TFT array substrate 10 can be decreased. Namely, the liquid crystal device 1 can be miniaturized. In addition, since an area corresponding to the reduced area required for wiring on the TFT array substrate 10 can be secured for wiring, the wire line widths of the power supply lines 63s and 62s or the power supply lines 63d and 62d can be enlarged. Therefore, the power supply lines 63s and 62s or the power supply lines 63d and 62d can be formed to have low resistance.

In FIGS. 12 and 13, in the liquid crystal device according to the embodiment, the power supply line 63s is formed with the same film as that of the data line 6a (see FIG. 12) in a pixel portion, that is, with the same type conductive film formed in the same process among the production processes, and the power supply line 62s is formed with the same film as that of the lower electrode 71 in the pixel portion. Similarly, although not shown, the power supply line 63d is formed with the same film as that of the data line 6a (see FIG. 12) in the pixel portions, that is, with the same type conductive film formed in the same process among the production processes, and the power supply line 62d is formed with the same film as that of the lower electrode in the pixel portion. Therefore, the power supply lines 63s and 63d can be formed at the same process for forming the data line 6a, and the power supply lines 62s and 62d can be formed at the same process for forming the lower electrode 7. As a result, the power supply lines 63s and 62s or the power supply lines 63d and 62d can be formed with different conductive films without complication of the production processes.

In addition, the power supply lines 62d, 62s, 63d, and 63s may be formed with the same film as that of any one of a conductive film for forming the data line 6a, a conductive film for forming the lower electrode 71, and a conductive film for forming the capacitor electrode 300.

In FIG. 14, in the liquid crystal device according to the embodiment, particularly, the power supply line 61d for supplying a power VDDX1 to the data line driver circuit 101 and the power supply line 61s for supplying the power VSSX1 thereto are formed with conductive films which are disposed in separate layers with the second interlayer insulating film 42 interposed therebetween. Therefore, a degree of a freedom in design for layout and wiring o the power supply line 61d and the power supply line 61s is heightened. In addition, as shown in FIG. 3, the power supply line 61d and the power supply line 61s are partially overlapped with each other in a plan view of the TFT array substrate 10. Therefore, it is possible to reduce an area required for wiring the power supply line 61d and the power supply line 61s on the TFT array substrate 10. As a result, a size of the TFT array substrate 10 can be decreased. Namely, the liquid crystal device 1 can be miniaturized. In addition, since an area corresponding to the reduced area required for wiring on the TFT array substrate 10 can be secured for wiring, the wire line widths of the power supply lines 61s and 61d can be enlarged. Therefore, the power supply lines 61s and 61d can be formed to have low resistance.

In FIGS. 12 and 14, in the liquid crystal device according to the embodiment, the power supply line 61d is formed with the same film as that of the data line 6a (see FIG. 12) in a pixel portion, and the power supply line 61s is formed with the same film as that of the lower electrode 71 in the pixel portion. Therefore, the power supply lines 61d and 61s can be formed at the same process for forming the data line 6a and at the same process for forming the lower electrode 7, respectively. As a result, the power supply lines 61d and 61s can be formed with different conductive films without complication of the production processes.

In addition, the power supply lines 61d and 61s may be formed with the same film as that of any one of a conductive film for forming the data line 6a, a conductive film for forming the lower electrode 71, and a conductive film for forming the capacitor electrode 300.

Similar to the construction shown in FIG. 14, the power supply line 65d for the power VDDY to the scan line driver circuits 104 and the power supply line 65s for supplying the power VSSY thereto may be also formed with conductive films which are disposed in separate layers with the second interlayer insulating film 42 interposed therebetween. In this case, it is possible to obtain the same advantages as those of the aforementioned case where the power supply line 61d and the power supply line 61s are formed to be disposed in the separate layers.

Modified Example of First Embodiment

Figure 15:
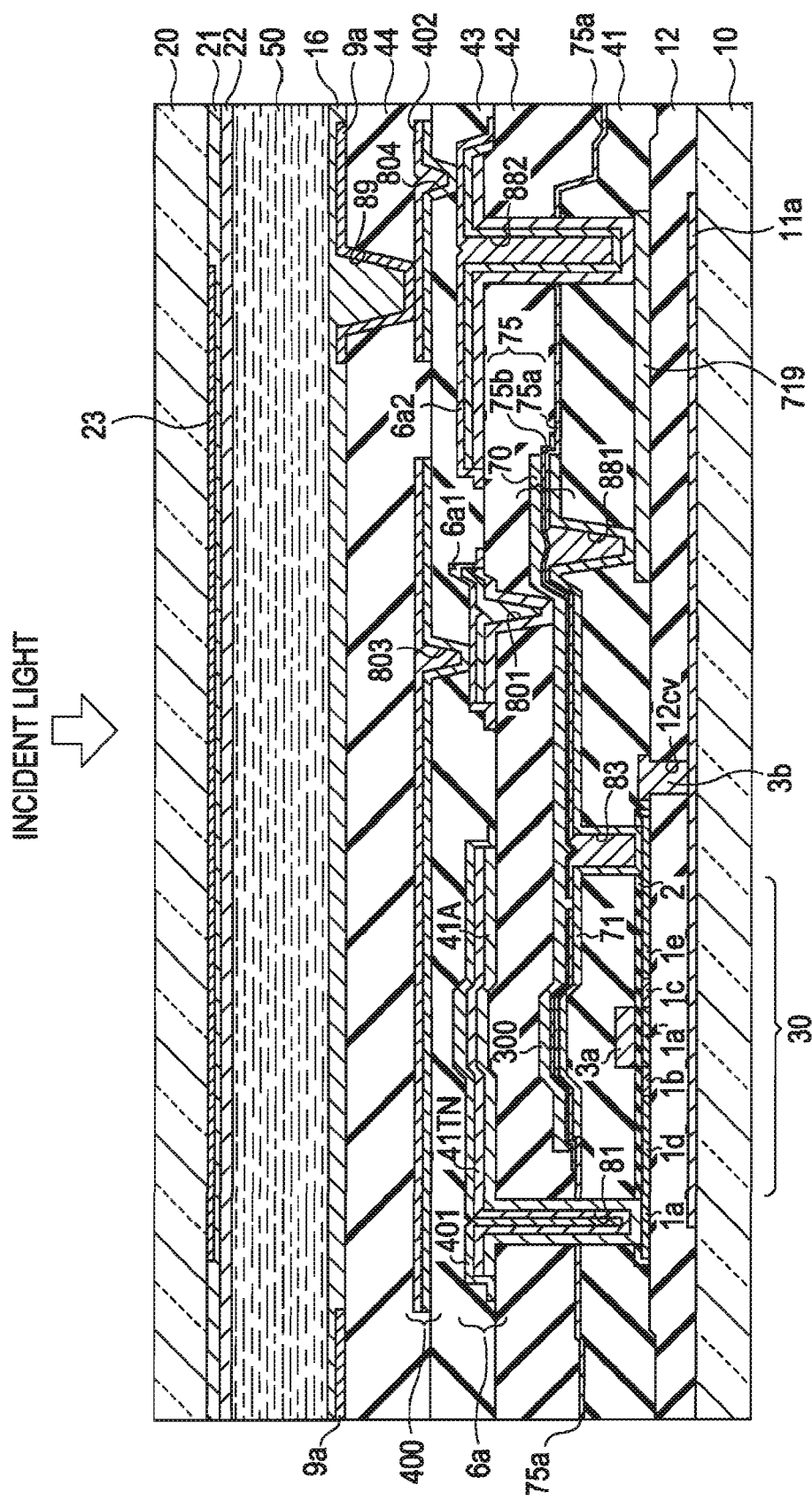
FIG. 15 is a view corresponding to FIG. 12 in a modified example.

Now, a modified example of the embodiment will be described with reference to FIG. 15. FIG. 15 is a view corresponding to FIG. 12 in the modified example. In FIG. 15, the same reference numerals denote the same elements as those of the liquid crystal device according to the first embodiment shown in FIG. 12, and detailed description thereof is omitted.

Referring to FIG. 15, circuit elements in the modified example of the embodiment includes, in the order of from the bottom, a first layer having a scan line 11, a second layer including a gate electrode 3a, a third layer including a storage capacitor 70, a fourth layer including a data line 6a or the like, a fifth layer including a capacitance wire line 400 or the like, and a sixth layer including a pixel electrode 9a or the like.

The construction of the first and second layers is substantially the same as that of the pixel portions in the aforementioned first embodiment.

Construction of Third Layer: Storage Capacitor or the Like

Referring to FIG. 5, the third layer includes the storage capacitor 70. The capacitor electrode 300 is electrically connected to the capacitance wire line 400.

The lower electrode 71 is electrically connected to a heavily-doped drain region 1e of the TFT 30 and the pixel electrodes 9a. In addition, the capacitance wire line 400 is an example of an "upper electrode" according to the invention.

The lower electrode 71 and the heavily-doped drain region 1e are connected to each other through a contact hole 83 formed by opening the first interlayer insulating film 41. In addition, the lower electrode 71 and the pixel electrodes 9a are electrically connected to each other through a path which is formed by allowing contact holes 881, 882, 804, and 89 to connect layers of an intermediate electrode 719, a second intermediate electrode 6a2, and a third intermediate electrode 402.

The capacitor electrode 300 is made of, for example, a metal including at least one of refractory metals such as Ti, Cr, W, Ta, and Mo, an alloy thereof, a metal silicide, a polysilicide, or a stacked structure thereof, or preferably, a tungsten silicide. The lower electrode 71 is made of, for example, a conductive polysilicon.

Construction of Fourth Layer: Data Line or the Like

Referring to FIG. 6, the fourth layer includes the data line 6a. The data line 6a is constructed with a three-layered film of aluminum, titan nitride, and silicon nitride layers in the order of from the bottom. The silicon nitride layer is patterned in a slightly large size so as to cover the underlying aluminum and titan nitride layers. In addition, the fourth layer includes the second intermediate electrode 6a2 in the same film as the data line 6a.

The data line 6a is electrically connected to the heavily-doped source region 1d of the TFT 30 through the contact hole 81 passing through the first interlayer insulating film 41 and the second interlayer insulating film 42. In addition, as described above, the second intermediate electrode 6a2 is electrically connected to the intermediate electrode 719 through the contact hole 822 passing through the first interlayer insulating film 41 and the second interlayer insulating film 42.

Construction of Fifth Layer: Capacitor Wire Line or the Like

Referring to FIG. 15, the fifth layer includes a capacitance wire line 400 and a third intermediate electrode 402. The capacitance wire line 400 is constructed with a two-layered structure formed by stacking, for example, an aluminum layer and a titan nitride layer. The capacitance wire line 400 and the capacitor electrode 300 are constructed to be connected to each other through the contact hole 801. In addition, the third intermediate electrode 402 is formed in the same film as the capacitance wire line 400. As described above, the third intermediate electrode 402 connects the second intermediate electrode 6a2 and the pixel electrode 9a through the contact hole 804 and the contact hole 89.

Construction of Sixth Layer: Pixel Electrode or the Like

Referring to FIG. 15, a contact hole for electrically connecting the pixel electrode 9a and the third intermediate electrode 402 is formed by opening the fourth interlayer insulating film 44.

Hereinbefore, the structure of the pixel portions according to the modified example of the embodiment is described.

As described above, in the pixel portion according to the modified example of the embodiment, the conductive film for forming the data line 6a and the conductive film for forming the capacitance wire line 400 are relatively high conductive films. Therefore, the power supply lines 61d, 61s, 62d, 62s, 63d, and 63s may be formed with the same film as any one of the two conductive films. By doing so, similar to the liquid crystal device according to the first embodiment, the power supply lines 63s and 62s, the power supply lines 63d and 62d, or the power supply lines 61d and 61s may be formed with different conductive films without complication of the production processes. Therefore, it is possible to reduce an area required for wiring the power supply lines 63s and 62s, the power supply lines 63d and 62d, or the power supply lines 61d and 61s on the TFT array substrate 10.

As described above, in the liquid crystal devices according to the embodiment and the modified example thereof, it is possible to reduce deformation in waveforms of the sampling signals applied to the sampling circuit 7 for sampling an image signal. In addition, since a degree of a freedom in design for power supply lines is heightened, the liquid crystal device can be miniaturized.

Second Embodiment

Figure 16:
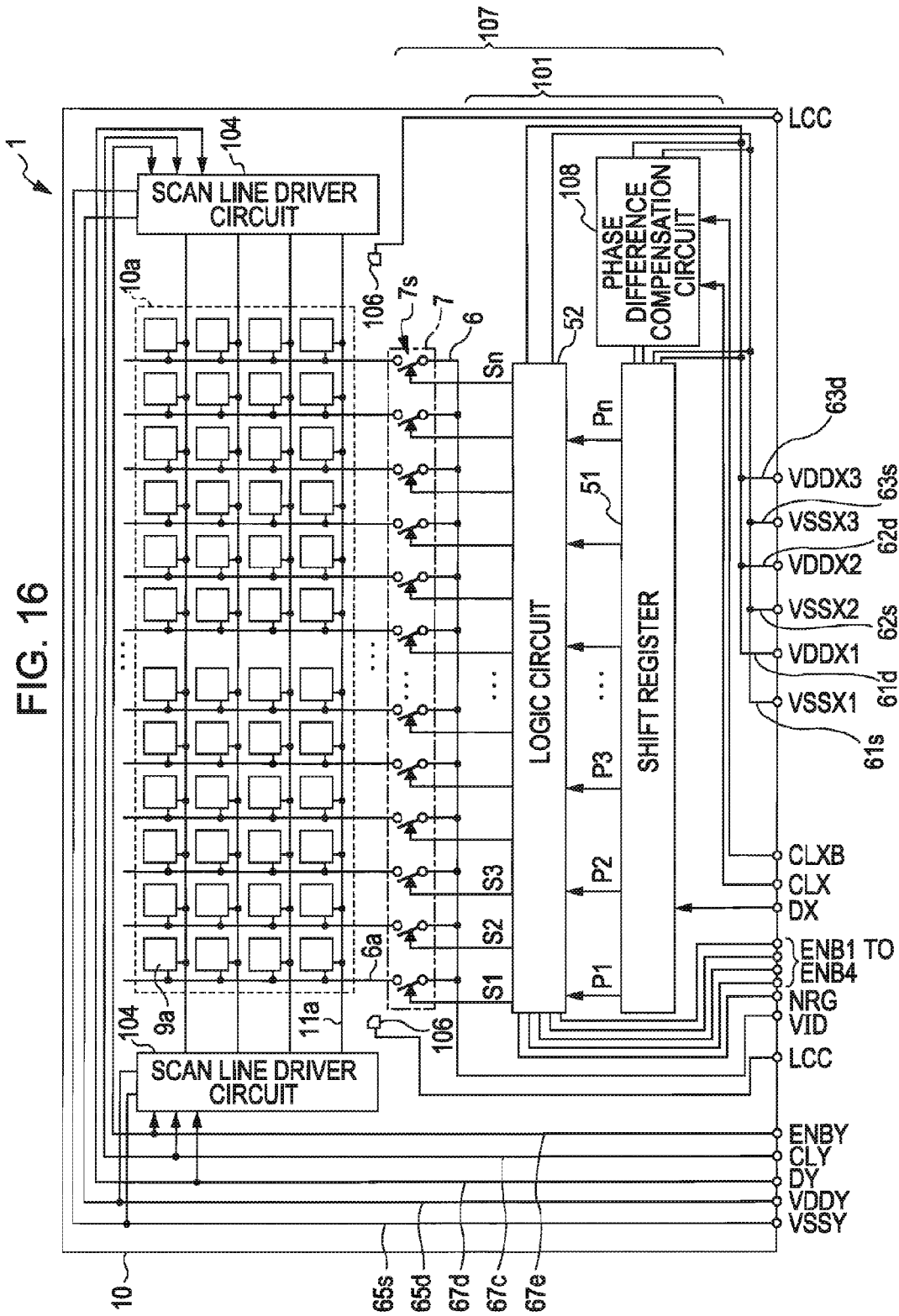
FIG. 16 is a circuit diagram corresponding to FIG. 3 in a second embodiment.
Figure 17:
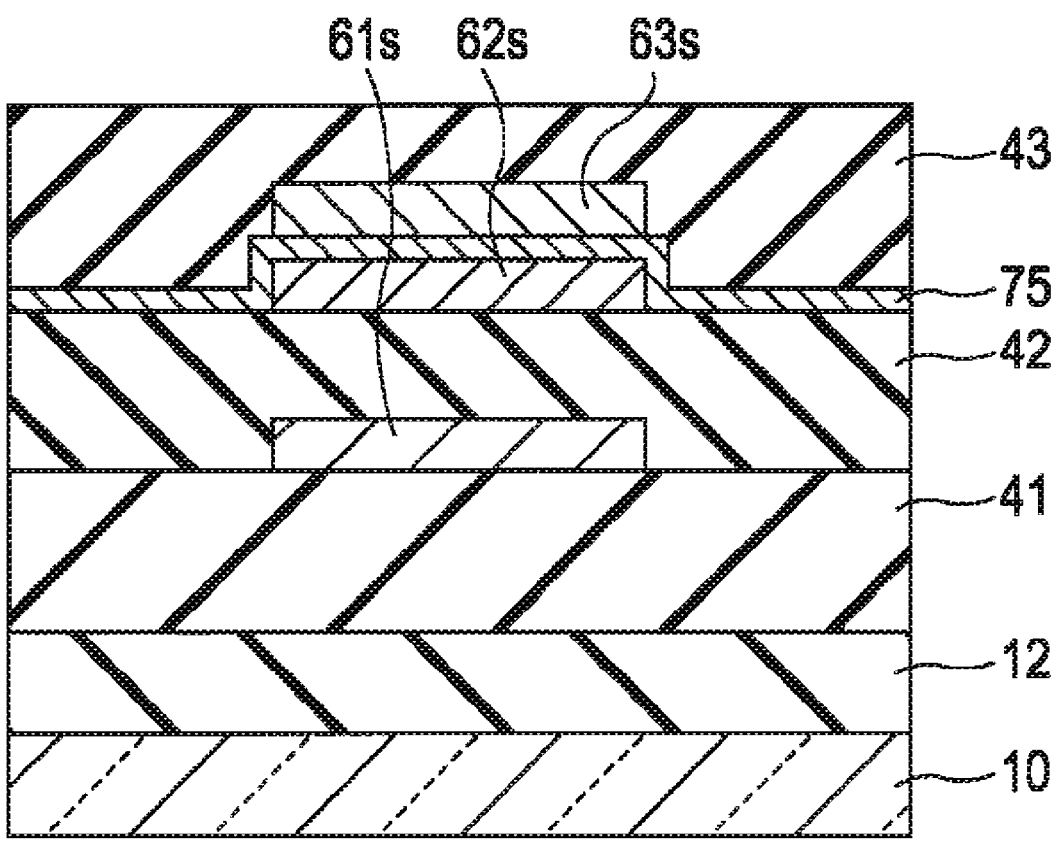
FIG. 17 is a cross-sectional view showing a stacked structure of power supply lines in the second embodiment.

A liquid crystal device according to a second embodiment will be described with reference to FIGS. 16 and 17. FIG. 16 is a circuit diagram corresponding to FIG. 3 in the second embodiment. FIG. 17 is a cross-sectional view showing a stacked structure of power supply lines in the second embodiment. In FIGS. 16 and 17, the same reference numerals denote the same elements as those according to the first embodiment shown in FIGS. 1 to 15, and detailed description thereof is omitted.

Referring to FIG. 16, in the liquid crystal device according to the embodiment, similar to the liquid crystal device according to the first embodiment, the data line driver circuit 101 is supplied with multiple-system powers. The data line driver circuit 101 includes the shift register 51, the logic circuit 52, and the phase difference compensation circuit 108, and these circuits are supplied with separate systemic powers. Namely, the shift register 51 is supplied with the powers VDDX1 and VSSX1 through the power supply lines 61d and 61s, respectively. The logic circuit 52 is supplied with the powers VDDX3 and VSSX3 through the power supply lines 63d and 63s, respectively. The phase difference compensation circuit 108 is supplied with the powers VDDX2 and VSSX2 through the power supply lines 63d and 63s, respectively.

As shown in FIG. 17, in the liquid crystal device according to the embodiment, particularly, the power supply lines 61s, 62s, and 63s are formed with conductive films which are disposed in separate layers with the second interlayer insulating film 42 or a dielectric film 75 interposed therebetween. Similarly, although not shown, the power supply lines 61d, 62d, and 63d are also formed with conductive films which are disposed in separate layers with the second interlayer insulating film 42 or the dielectric film 75 interposed therebetween.

Therefore, a degree of a freedom in design for layout and wiring of the power supply lines 61s, 62s, and 63s or the power supply lines 61d, 62d, and 63d is heightened. In addition, as shown in FIG. 16, the power supply lines 61s, 62s, and 63s or the power supply lines 61d, 62d, and 63d are partially overlapped with each other in a plan view of the TFT array substrate 10. Therefore, it is possible to reduce an area required for wiring the power supply lines 61s, 62s, and 63s or the power supply lines 61d, 62d, and 63d on the TFT array substrate 10. As a result, a size of the TFT array substrate 10 can be decreased. Namely, the liquid crystal device 1 can be miniaturized. In addition, a space corresponding to a portion where the power supply lines 61s, 62s, and 63s or the power supply lines 61d, 62d, and 63d are partially overlapped with each other in a plan view of the TFT array substrate 10 can be secured for wiring on the TFT array substrate 10. Therefore, the wiring can be performed by leading the power supply lines 61s, 62s, and 63s and the power supply lines 61d, 62d, and 63d from the same side (the left side in FIG. 16) with respect to the data line driver circuit 101. Namely, since the wiring can be performed by separating any one of the power supply lines 61d, 61s, 62d, 62s, 63d and 63s from the wire lines for applying the clock signal CLX or the enable signals ENB1 to ENB4 having a relatively high frequency, it is possible to securely reduce deformation of signals caused by interference between the wire lines.

Third Embodiment

Figure 18:
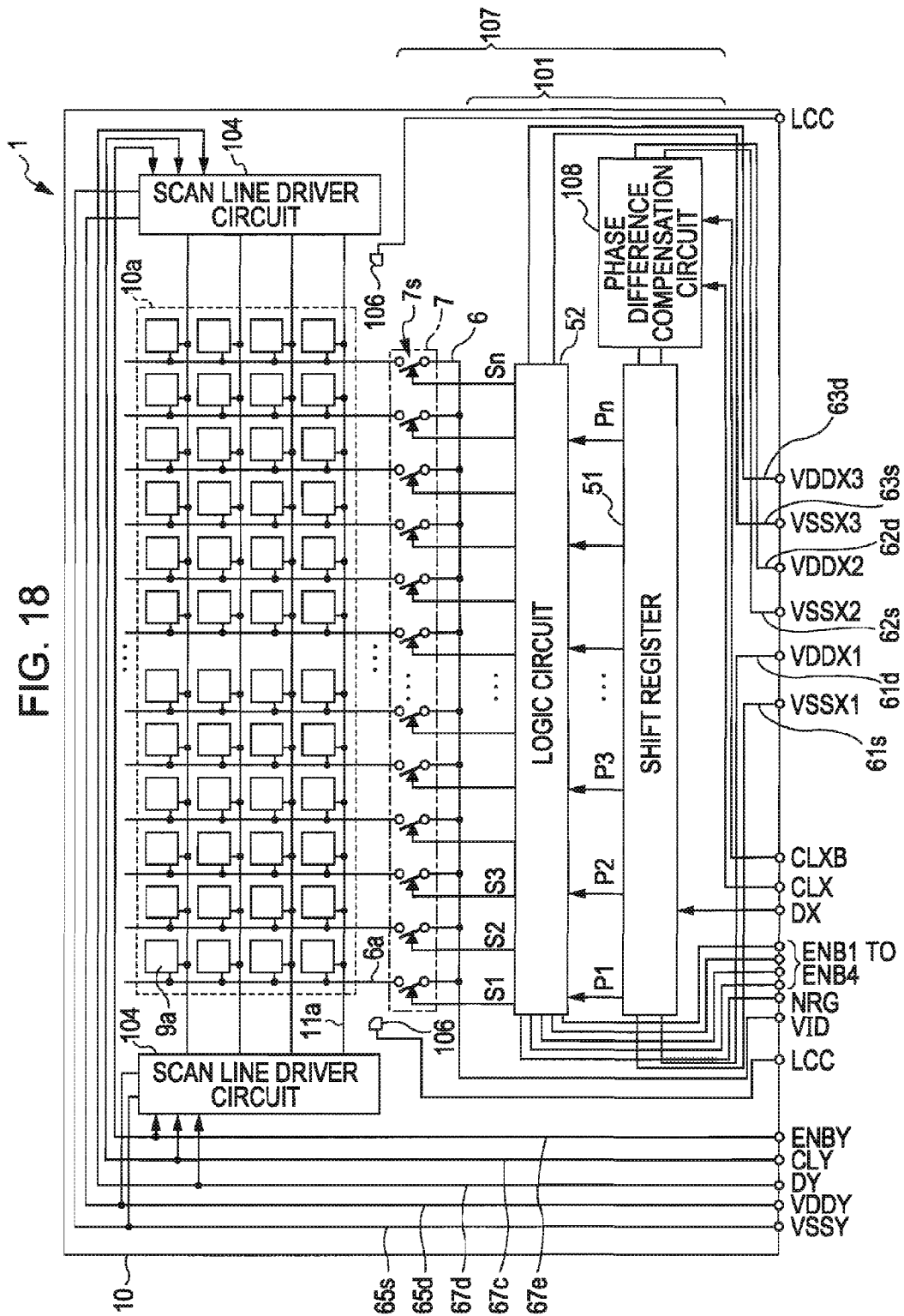
FIG. 18 is a circuit diagram corresponding to FIG. 3 in a third embodiment.
Figure 19:
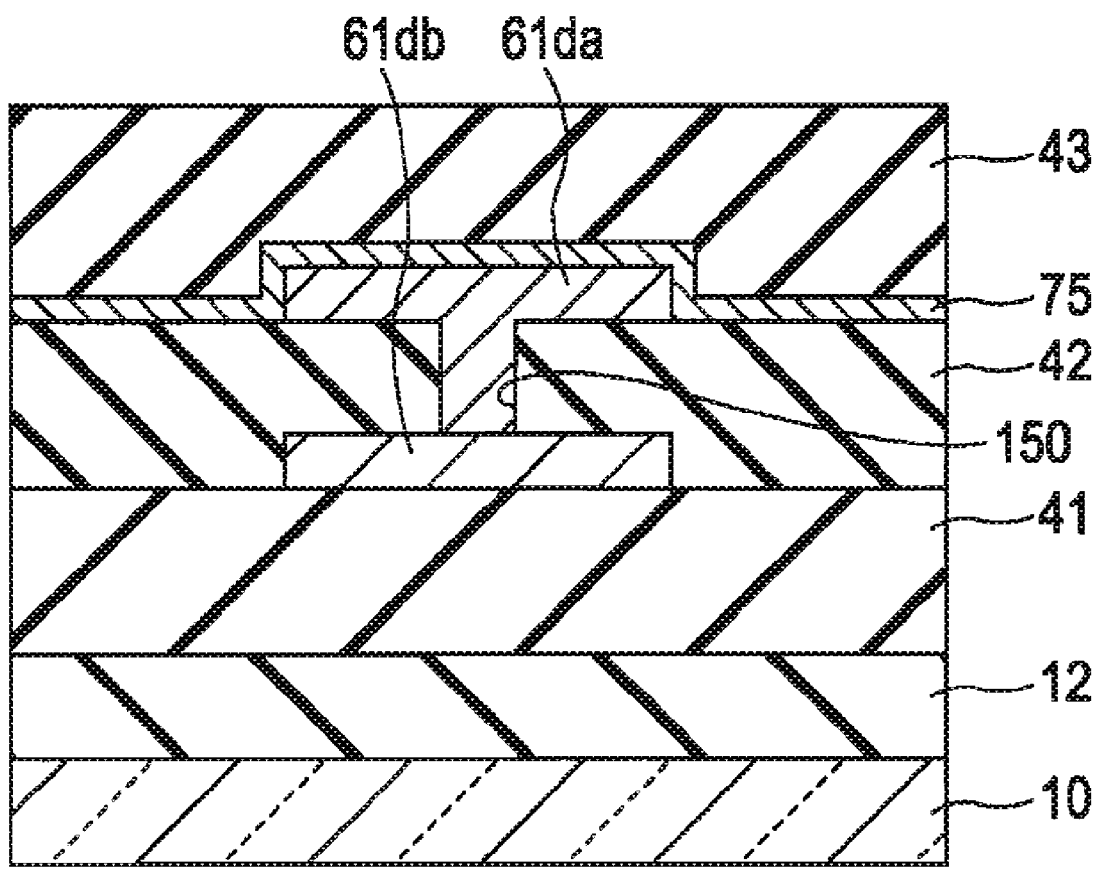
FIG. 19 is a cross-sectional view showing a stacked structure of power supply lines in the third embodiment.

A liquid crystal device according to a third embodiment will be described with reference to FIGS. 18 and 19. FIG. 18 is a circuit diagram corresponding to FIG. 3 in the third embodiment. FIG. 19 is a cross-sectional view showing a stacked structure of power supply lines in the third embodiment. In FIGS. 18 and 19, the same reference numerals denote the same elements as those according to the first embodiment shown in FIGS. 1 to 14, and detailed description thereof is omitted.

Referring to FIG. 18, in the liquid crystal device according to the embodiment, similar to the liquid crystal device according to the first embodiment, the data line driver circuit 101 is supplied with multiple-system powers. The data line driver circuit 101 includes the shift register 51, the logic circuit 52, and the phase difference compensation circuit 108, and these circuits are supplied with separate systemic powers. Namely, the shift register 51 is supplied with the powers VDDX1 and VSSX1 through the power supply lines 61d and 61s, respectively. The logic circuit 52 is supplied with the powers VDDX3 and VSSX3 through the power supply lines 63d and 63s, respectively. The phase difference compensation circuit 108 is supplied with the powers VDDX2 and VSSX2 through the power supply lines 63d and 63s, respectively.

As shown in FIG. 19, in the liquid crystal device according to the embodiment, particularly, the power supply line 61d for supplying a power VDDX1 to the data line driver circuit 101 is formed with partial wire lines 61da and 61db constructed with two conductive films which are disposed in separate layers with the second interlayer insulating film 42 interposed therebetween. The partial wire lines 61da and 61db are electrically connected to each other through at least one contact hole 150 formed by opening the second interlayer insulating films 42. Namely, the partial wire lines 61da and 61db serve as redundant wire lines therefore. Therefore, in comparison with a case where the power supply line 61d is constructed with a single conductive film, it is possible to stably supply the power VDDX1 to the data line driver circuit 101.

Similarly, the power supply lines 61s, 62d, 62s, 63d, and 63s may also be used as redundant wire lines formed partial wire lines constructed with two conductive films which are disposed in the separate layers. In addition, the partial wire lines may be constructed with any conductive film of the conductive film for forming the data line 6a, the conductive film for forming the lower electrode 71, and the conductive film for forming the capacitor electrode 300.

Fourth Embodiment

Figure 20:
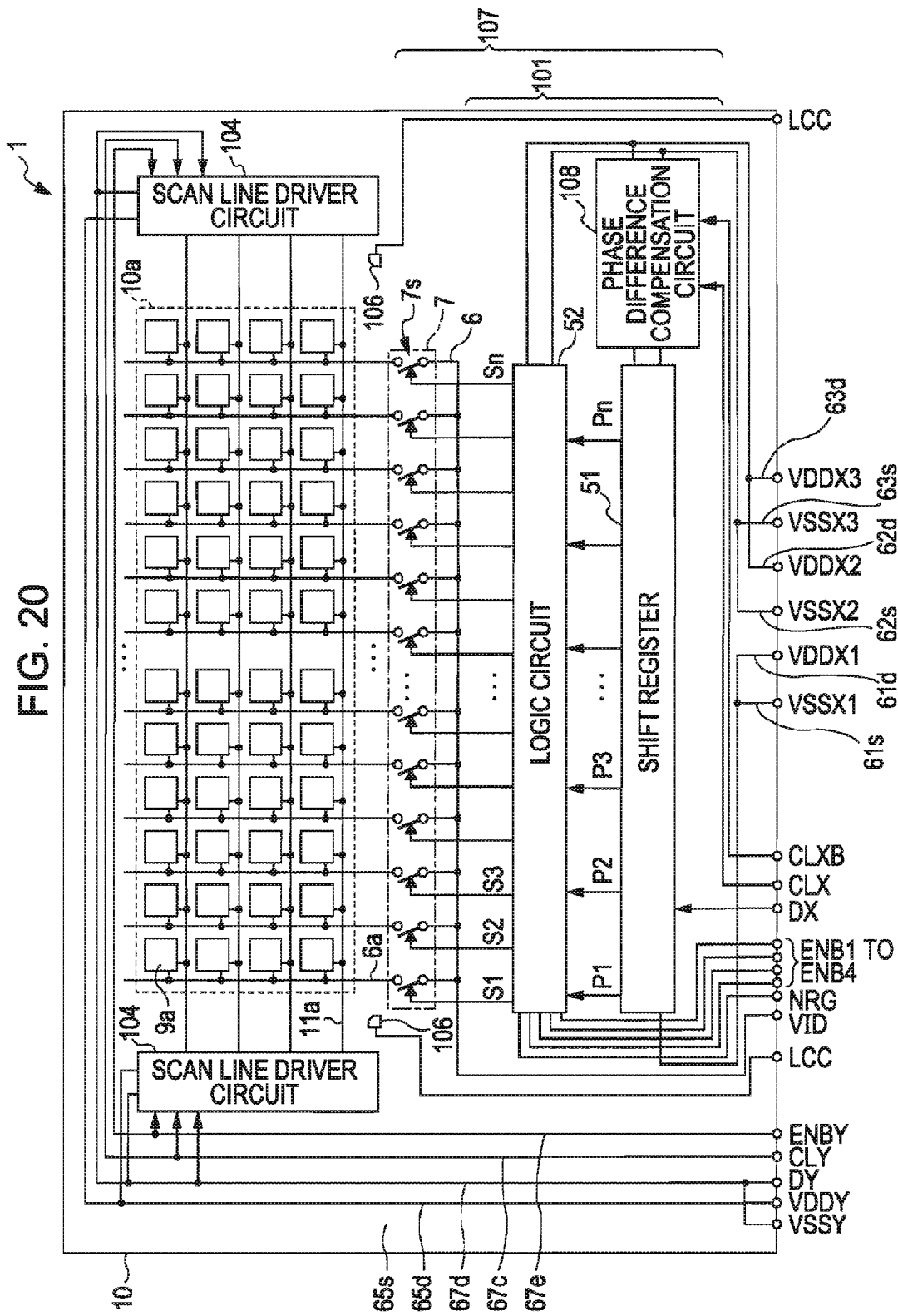
FIG. 20 is a circuit diagram corresponding to FIG. 3 in a fourth embodiment.
Figure 21:
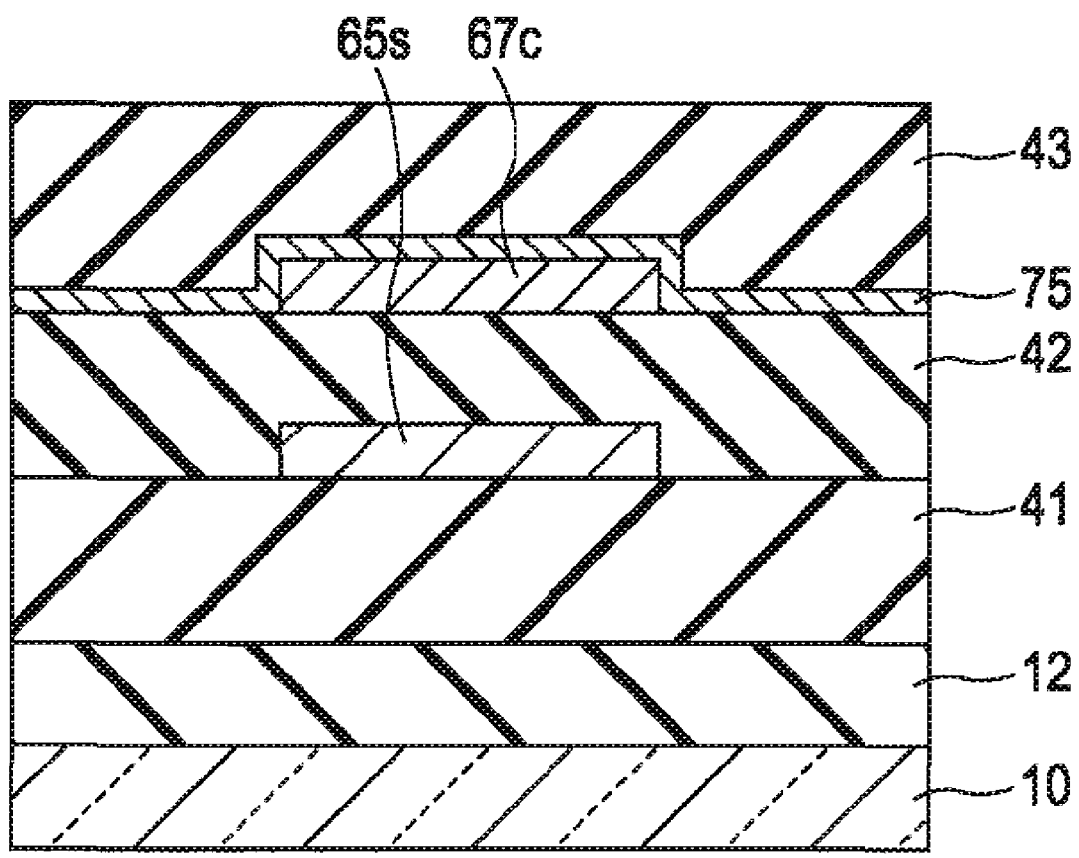
FIG. 21 is a cross-sectional view showing a stacked structure of wire lines for scan line driver circuits in the fourth embodiment.

A liquid crystal device according to a fourth embodiment will be described with reference to FIGS. 20 and 21. FIG. 20 is a circuit diagram corresponding to FIG. 3 in the fourth embodiment. FIG. 21 is a cross-sectional view showing a stacked structure of wire lines for scan line driver circuits in the fourth embodiment. In FIGS. 20 and 21, the same reference numerals denote the same elements as those according to the first embodiment shown in FIGS. 1 to 15, and detailed description thereof is omitted.

In FIG. 20, in the liquid crystal device according to the embodiment, similar to the liquid crystal device according to the first embodiment, the scan line driver circuits 104 are supplied with the powers VDDY and VSSY through the power supply lines 65d and 65s. In addition, the scan line driver circuits 104 are also applied with scan-line-driver-circuit control signals such as a clock signal CLY, a shift register start signal DY, and an enable signal ENBY through scan-line-driver-circuit control signal wire lines 67c, 67d, and 67e.

As shown in FIG. 21, in the liquid crystal device according to the embodiment, particularly, the power supply line 65s for supplying the power VSSY to the scan line driver circuits 104 and the scan-line-driver-circuit control signal wire line 67d for applying the shift register start signal DY thereto are constructed with conductive films which are disposed in separate layers with the interlayer insulating films 42 interposed therebetween. Therefore, a degree of a freedom in design for layout and wiring power supply line 65s and the scan-line-driver-circuit control signal wire line 67d is heightened. In addition, as shown in FIG. 20, power supply line 65s and the scan-line-driver-circuit control signal wire line 67d are partially overlapped with each other in a plan view of the TFT array substrate 10. Therefore, it is possible to reduce an area required for wiring the power supply line 65s and the scan-line-driver-circuit control signal wire line 67d on the TFT array substrate 10. As a result, a size of the TFT array substrate 10 can be decreased. Namely, the liquid crystal device 1 can be miniaturized. In addition, a space corresponding to a portion where power supply line 65s and the scan-line-driver-circuit control signal wire line 67d are partially overlapped with each other in a plan view of the TFT array substrate 10 can be secured for wiring on the TFT array substrate 10. Therefore, a degree of a freedom in design of other wire lines can be heightened.

The power supply line 65s and wire lines for applying the clock signal to the data line driver circuit 101 are not overlapped with each other in a plan view of the TFT array substrate 10. In addition, the frequencies of the scan-line-driver-circuit control signals such as a clock signal CLY, a shift register start signal DY, and an enable signals are about several tens kHz and lower than the frequency of the clock signal CLX applied to the data line driver circuit 101 which is about several MHz. Therefore, a few or any failure in operations of the scan line driver circuits 104 due to the clock noise propagated through the power supply for driving the scan line driver circuits 104 to various circuits included in the scan line driver circuits 104 do not occur.

In addition, the power supply line 65s and any one of the scan-line-driver-circuit control signal wire lines 67d, 67c, and 67e may be at least partially overlapped with each other in a plan view of the TFT array substrate 10, and the power supply line 65d and any one of the scan-line-driver-circuit control signal wire lines 67d, 67c, and 67e may be at least partially overlapped with each other in a plan view of the TFT array substrate 10.

In addition, in a case where any one of the wire lines 61s and 61d for supplying the powers to the data line driver circuit 101 and a wire line for applying the clock signal CLX thereto are formed in a stacked structure constructed with conductive films which are disposed in separate layers as shown in FIG. 21, it is preferable that a thickness of the insulating layer 42 is formed to be locally sufficiently large, or it is preferable that a shied layer is formed between the conductive films.

This is because, if the wire lines for applying the clock signal CLX is stacked on the power supply lines, due to capacitive coupling therebetween, variation in potential of the clock signal CLX causes variation in potential of the power VSSX1 or VDDX1. However, since the clock signal CLX has a higher frequency that other control signals, the variation in power potential become high frequency, so that failures in operation of the driver circuit occurs.

Therefore, as described above, by locally increasing a thickness of the insulating layer 42 in comparison with other positions or by forming the shied layer, the capacitive coupling between the wire line for applying the clock signal CLX and the power supply lines can be prevented, so that the aforementioned failure can be prevented.

Electronic Apparatus

Now, a variety of electronic apparatuses employing the liquid crystal device which is an electro-optical device will be described.

Figure 22:
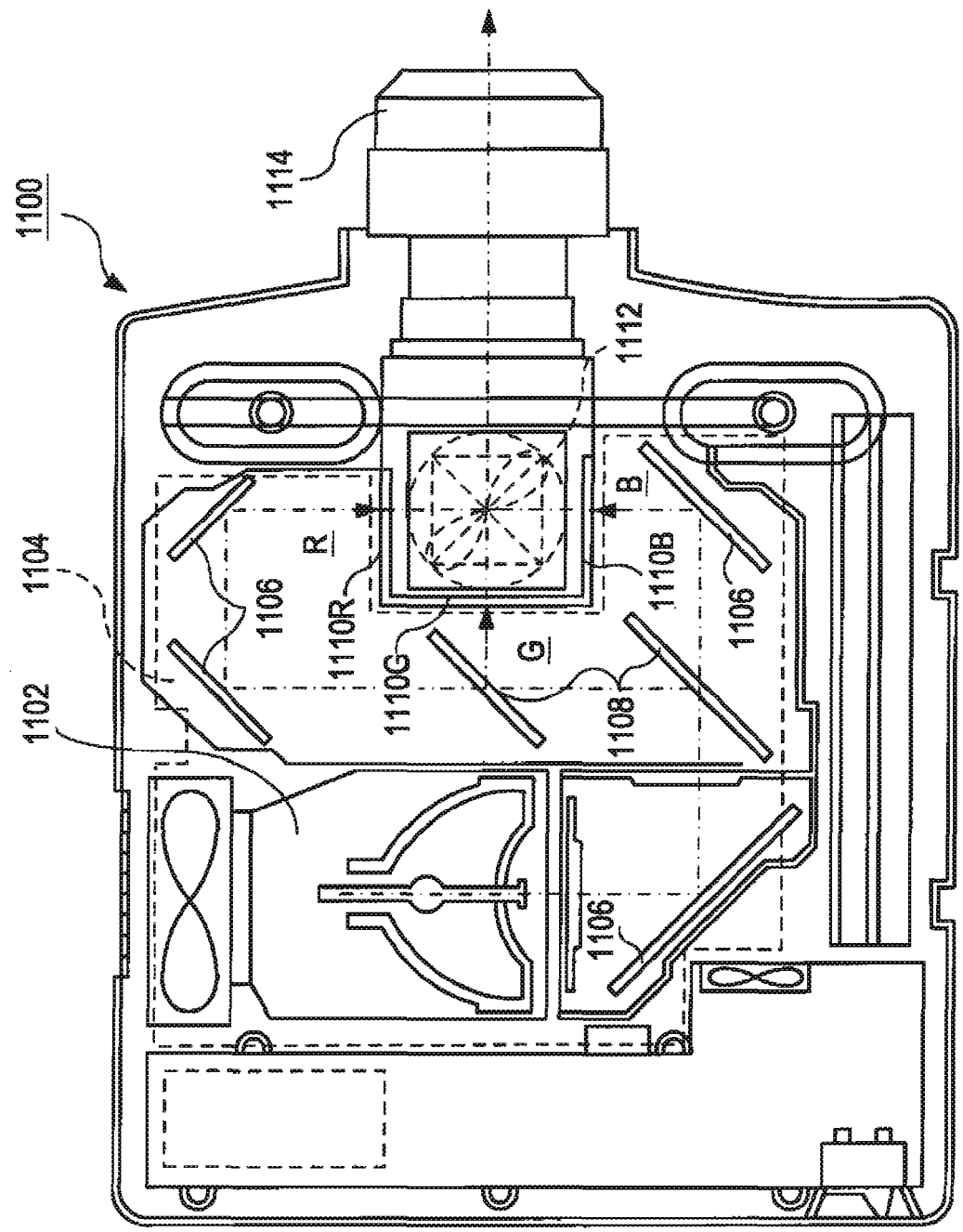
FIG. 22 is a perspective view showing a construction of a personal computer as an example of an electronic apparatus employing an electro-optical device.

First, a projector employing the liquid crystal device as a light valve will be described. FIG. 22 is a plan view showing an exemplary construction of a projector. As shown in FIG. 22, a lamp unit 1102 including a white light source such as a halogen lamp is disposed in the projector 1100. Projection light emitted from the lamp unit 1102 is divided into light components corresponding to three primary colors of R, G, and B by four sheets of mirrors 1106 and two sheets of dichroic mirrors 1108 and the light components are guided to liquid crystal panels 1110R, 1110G, and 1110B as light valves corresponding to the primary colors.

The liquid crystal panels 110R, 110G, and 110B have a construction equal to that of the liquid crystal device and are driven in response to primary color signals supplied from an image signal processing circuit. The light components modulated by the liquid crystal panels are incident on a dichroic prism 1112 from three sides. In the dichroic prism 1112, the light components of R and B are refracted by 90 degrees and the light component of G goes straightly. Accordingly, the light components are synthesized and thus a color image is projected to a screen through a projection lens 1114.

Here, paying attention to display images from the liquid crystal panels 1110R, 1110G, and 110B, the display image from the liquid crystal panel 1110G are laterally inverted with respect to the display images from the liquid crystal panels 1110R and 1110B.

Since the light components corresponding to the primary colors of R, G, and B are incident on the liquid crystal panels 1110R, 1110G, and 1110B through the dichroic mirrors 1108, it is not necessary to dispose color filters.

Figure 23:
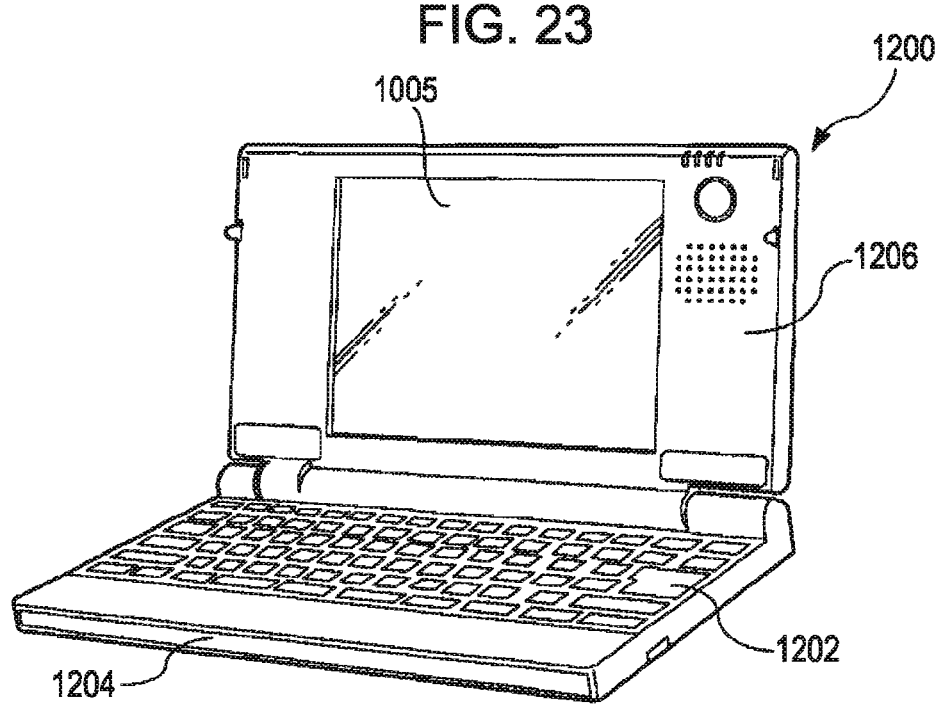
FIG. 23 is a perspective view showing a construction of a personal computer as an example of an electronic apparatus employing an electro-optical device.

Now, a mobile personal computer employing the liquid crystal device is described. FIG. 23 is a perspective view showing a construction of the mobile personal computer. As shown in FIG. 23, the personal computer 1200 includes a main body unit 1204 having a keyboard 1202 and a liquid crystal display unit 1206. In the liquid crystal display unit 1206, a backlight is disposed in the back side of the liquid crystal device 1005 described above.

Figure 24:
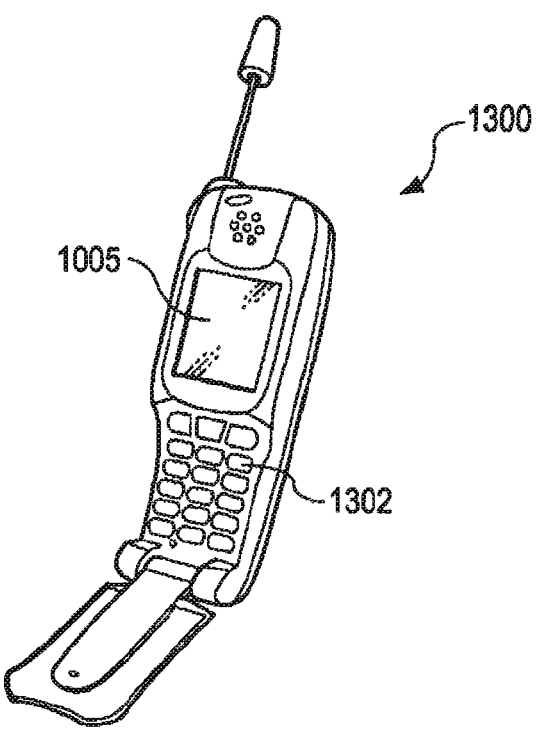
FIG. 24 is a perspective view showing a construction of a mobile phone as an example of an electronic apparatus employing an electro-optical device.

Now, a mobile phone employing the liquid crystal device is described. FIG. 24 is a perspective view showing a construction of the mobile phone. As shown in FIG. 24, the mobile phone 1300 includes a plurality of manipulation buttons 1302 and a reflective liquid crystal device 105. In the reflective liquid crystal device 1005, a front light is disposed in the front side thereof as needed.

In addition to the electronic apparatuses described with reference to FIGS. 17 to 19, examples of the electronic apparatus can include a liquid crystal television, a view finder type or monitor direct vision-type video tape recorder, a car navigation apparatus, a pager, an electronic pocketbook, an electronic calculator, a word processor, a work station, a television phone, a POS terminal, an apparatus having a touch panel, and the like. The above-mentioned electro-optical device can apply to the electronic apparatuses.

In addition to the liquid crystal device described in the above-mentioned embodiments, the invention can apply to a reflective liquid crystal display device (LCOS), a plasma display panel (PDP), a field emission display (FED, SED), an organic EL display, a digital micromirror device (DMD), an electrophoresis device, and the like in which elements are formed on a silicon substrate.

The invention is not limited to the above-mentioned embodiments, but can be properly modified in various forms without departing from the gist and spirit of the invention which can be understood from the appended claims and the whole specification. Therefore, it can be understood by those skilled in the art that an electro-optical device including such modifications, an electronic apparatus employing the electro-optical device, and a method of manufacturing the electro-optical device belong to the technical scope of the invention.

What is claimed is:

1. An electro-optical device comprising:
a substrate;
a plurality of data lines and a plurality of scan lines disposed on the substrate to intersect each other;
a plurality of pixels corresponding to intersections of the data lines and the scan lines;
a sampling circuit including a plurality of sampling switches which apply image signals through the data lines to the plurality of pixels according to a sampling signal;
a data line driver circuit which applies the sampling signal to the sampling circuit, the data line driver circuit includes:
a shift register sequentially outputting transmission signals from a plurality of stages based on a clock signal having a predetermined period;
a phase difference compensation circuit compensating for a phase difference between the clock signal having the predetermined period and an inverted clock signal having an inverted phase with respect to the clock signal; and
a logic circuit implementing logical operation between the transmission signals and an enable signal;
a first pair of terminals disposed on the substrate;
a first pair of power supply lines electrically connecting between the first pair of terminals and one of the shift register, the phase difference compensation circuit, and the logic circuit, the first pair of power supply lines supplying a first constant voltage for driving the one of the shift register, the phase difference compensation circuit, and the logic circuit;
a second pair of terminals disposed on the substrate different from the first pair of terminals; and
a second pair of power supply lines different from the first pair of power supply lines, the second pair of power supply lines electrically connecting between the second pair of terminals and one other of the shift register, the phase difference compensation circuit, and the logic circuit, the second pair of power supply lines supplying a second constant voltage for driving the one other of the shift register, the phase difference compensation circuit, and the logic circuit, the first and second constant voltages being substantially a same potential, and wherein the first pair of power supply lines and the second pair of power supply lines each includes a high potential power supply line and a low potential power supply line.

2. The electro-optical device according to claim 1, further comprising:
a third pair of terminals disposed on the substrate different from the first pair of terminals and the second pair of terminals;
a third pair of power supply lines different from the first pair of power supply lines and the second pair of power supply lines, the third pair of power supply lines electrically connecting between the third pair of terminals and a remainder of the shift register, the phase difference compensation circuit, and the logic circuit not connected to the first pair of power supply lines or the second pair of power supply lines, and wherein the third pair of power supply lines includes a high potential power supply line and a low potential power supply line.

3. The electro-optical device according to claim 1, wherein external power supplies supply a plurality of pairs of power supplies, one pair of the plurality of pairs of power supplies for each of the first pair of terminals and the second pair of terminals, supplying power through a plurality of power supply units which are individually provided corresponding to the plurality of pairs of power supplies.

4. The electro-optical device according to claim 1, wherein the first pair of power supply lines and the second pair of power supply lines are constructed with a plurality of conductive films which are located in separate layers interposed between interlayer insulating films.

5. The electro-optical device according to claim 4,
wherein each of the pixels includes a storage capacitor which is constructed by sequentially stacking a lower electrode, a dielectric film, and an upper electrode on the substrate, and
wherein each of the conductive films is the same as any one of conductive films which constitutes the data lines, the lower electrode, and the upper electrode.

6. The electro-optical device according to claim 4,
wherein one power supply line of the first pair of power supply lines or of the second pair of power supply lines and an other power supply line which is different from the one power supply line is constructed with different ones of the plurality of conductive films which are at least partially different from each other, and
wherein the one power supply line and the other power supply line at least partially overlap each other on the substrate in a plan view thereof.

7. The electro-optical device according to claim 1, wherein at least two high potential power supply lines among the first pair of power supply lines and the second pair of power supply lines are constructed with different conductive films and at least partially overlap with each other on the substrate in a plan view thereof.

8. The electro-optical device according to claim 1, wherein at least two low potential power supply lines among the first pair of power supply lines and the second pair of power supply lines are constructed with different conductive films and at least partially overlap each other on the substrate in a plan view thereof.

9. The electro-optical device according to claim 1,
wherein at least one power supply line among the first pair of power supply lines and the second pair of power supply lines is constructed with a plurality of partial wire lines which are constructed with at least two layers of conductive films among a plurality of the conductive films, and
wherein a plurality of the partial wire lines are electrically connected to each other through contact holes and at least partially overlap each other on the substrate in a plan view thereof.

10. An electronic apparatus comprising the electro-optical device according to claim 1.

* * * * *